(12) United States Patent
Tobita

(10) Patent No.: US 7,002,894 B2
(45) Date of Patent: Feb. 21, 2006

(54) DISC-SHAPED RECORDING MEDIUM, MANUFACTURING METHOD AND MANUFACTURING DEVICE THEREOF, AND DATA RECORDING METHOD

(75) Inventor: Minoru Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 10/478,219

(22) PCT Filed: Mar. 18, 2003

(86) PCT No.: PCT/JP03/03286

§ 371 (c)(1),
(2), (4) Date: Nov. 28, 2003

(87) PCT Pub. No.: WO03/083846

PCT Pub. Date: Oct. 9, 2003

(65) Prior Publication Data

US 2005/0073923 A1    Apr. 7, 2005

(30) Foreign Application Priority Data

Mar. 29, 2003 (JP) ............................ P2002-098044

(51) Int. Cl.
*G11B 7/24* (2006.01)
(52) U.S. Cl. ..................... 369/257; 369/47.28
(58) Field of Classification Search ............ 369/275.3, 369/275.2, 275.4, 47.43, 47.4, 47.46, 44.26, 369/47.38, 47.47, 47.54, 53.29, 47.28
See application file for complete search history.

(56) References Cited

U.S. PATENT DOCUMENTS

| | | | |
|---|---|---|---|
| 6,172,952 B1 | 1/2001 | Inokuchi et al. | |
| 6,603,729 B1 * | 8/2003 | Van Den Enden | 369/275.3 |
| 6,751,185 B1 * | 6/2004 | Van Den Enden | 369/275.3 |
| 2001/0026515 A1 | 10/2001 | Mochizuki et al. | |
| 2001/0050888 A1 | 12/2001 | Eguchi et al. | |

FOREIGN PATENT DOCUMENTS

| | | |
|---|---|---|
| EP | 813198 | 12/1997 |
| EP | 821350 | 1/1998 |
| EP | 1 207 531 A2 | 5/2002 |
| JP | 10-134357 | 5/1998 |
| JP | 11-45439 | 2/1999 |
| JP | 2000-113453 | 4/2000 |
| WO | WO 00/08636 | 2/2000 |

OTHER PUBLICATIONS

Patent Abstracts of Japan, JP 2000-113453, Apr. 21, 2000.
Patent Abstracts of Japan, JP 10-134357, May 22, 1998.

* cited by examiner

*Primary Examiner*—Ali Neyzari
(74) *Attorney, Agent, or Firm*—Oblon, Spivak, McClelland, Maier & Neustadt, P.C.

(57) ABSTRACT

An optical disc (200) according to the present invention has a recording area divided into 28 zones of from a zone $Z_0$ to a zone $Z_{27}$. In a given zone, the number of waves of a wobble is set so as to be equal, that is, the number of waves of the ADIP carrier is set so as to be equal, between optional two neighboring turns of the track or between optional two neighboring tracks. This achieves inphase-outphase matching on an average, for decreasing a WPP signal, so that such an optical disc may be provided in which no low frequency components are superposed on push-pull signals, even though the optical disc is of such a type in which the track pitch is narrower than 1.6 μm, such as 1.25 μm, or in which a mark is detected by DWDD from a groove, as in the case of the next generation MD2.

9 Claims, 28 Drawing Sheets

| Zone | Start R(m) | end R(m) | NUMBER OF CARRIERS/TR | SYSTEM CLOCKS | PLL(M) | INNERMOST RIM LINE DENSITY | NUMBER OF TRACKS/zone | OUTERMOST RIM LINE DENSITY | DENSITY RATIO | NUMBER OF CLUSTERS | CUMULATIVE CAPACITY (MB) |
|---|---|---|---|---|---|---|---|---|---|---|---|
| -1 | 0.0159988 | 0.0159988 | 4704 | 2.25792 | 16 | 1.524E-07 | | 1.524E-07 | | | 19.399 |
| 0 | 0.0160000 | 0.0164000 | 4410 | 2.1168 | 35 | 1.626E-07 | 320 | 1.667E-07 | 2.50% | 296 | 19.202 |
| 1 | 0.0164000 | 0.0167850 | 4536 | 2.17728 | 36 | 1.620E-07 | 308 | 1.658E-07 | 2.35% | 293 | 19.202 |
| 2 | 0.0167850 | 0.0172050 | 4662 | 2.23776 | 37 | 1.614E-07 | 336 | 1.654E-07 | 2.50% | 329 | 21.561 |
| 3 | 0.0172050 | 0.0176250 | 4778 | 2.29824 | 38 | 1.611E-07 | 336 | 1.650E-07 | 2.44% | 338 | 22.151 |
| 4 | 0.0176250 | 0.0180450 | 4914 | 2.35872 | 39 | 1.608E-07 | 336 | 1.646E-07 | 2.38% | 347 | 22.741 |
| 5 | 0.0180450 | 0.0185000 | 5040 | 2.4192 | 40 | 1.605E-07 | 364 | 1.645E-07 | 2.52% | 386 | 25.297 |
| 6 | 0.0185000 | 0.0189200 | 5166 | 2.47968 | 41 | 1.605E-07 | 336 | 1.641E-07 | 2.27% | 365 | 23.921 |
| 7 | 0.0189200 | 0.0194000 | 5292 | 2.54016 | 42 | 1.602E-07 | 384 | 1.643E-07 | 2.54% | 428 | 28.049 |
| 8 | 0.0194000 | 0.0198200 | 5418 | 2.60064 | 43 | 1.605E-07 | 336 | 1.640E-07 | 2.16% | 383 | 25.100 |
| 9 | 0.0198200 | 0.0202200 | 5544 | 2.66112 | 44 | 1.602E-07 | 392 | 1.642E-07 | 2.47% | 458 | 30.015 |
| 10 | 0.0202200 | 0.0207300 | 5670 | 2.7216 | 45 | 1.605E-07 | 336 | 1.639E-07 | 2.07% | 401 | 26.280 |
| 11 | 0.0207300 | 0.0207300 | 5796 | 2.78208 | 46 | 1.603E-07 | 392 | 1.641E-07 | 2.36% | 479 | 31.392 |
| 12 | 0.0207300 | 0.0216400 | 5922 | 2.84256 | 47 | 1.606E-07 | 336 | 1.638E-07 | 1.98% | 419 | 27.460 |
| 13 | 0.0216400 | 0.0221825 | 6048 | 2.90304 | 48 | 1.604E-07 | 434 | 1.644E-07 | 2.51% | 554 | 36.307 |

FIG.13

| Zone | Start R(m) | end R(m) | NUMBER OF CARRIERS/TR | SYSTEM CLOCKS | PLL(M) | INNERMOST RIM LINE DENSITY | NUMBER OF TRACKS/zone | OUTERMOST RIM LINE DENSITY | DENSITY RATIO | NUMBER OF CLUSTERS | CUMULATIVE CAPACITY (MB) |
|---|---|---|---|---|---|---|---|---|---|---|---|
| 14 | 0.0221825 | 0.0227425 | 6174 | 2.96352 | 49 | 1.610E-07 | 448 | 1.651E-07 | 2.52% | 584 | 38.273 |
| 15 | 0.0227425 | 0.0233025 | 6300 | 3.024 | 50 | 1.618E-07 | 448 | 1.658E-07 | 2.46% | 596 | 39.059 |
| 16 | 0.0233025 | 0.0238625 | 6426 | 3.08448 | 51 | 1.625E-07 | 448 | 1.664E-07 | 2.40% | 608 | 39.846 |
| 17 | 0.0238625 | 0.0244225 | 6678 | 3.20544 | 53 | 1.602E-07 | 448 | 1.639E-07 | 2.35% | 632 | 41.419 |
| 18 | 0.0244225 | 0.0249825 | 6804 | 3.26592 | 54 | 1.609E-07 | 448 | 1.646E-07 | 2.29% | 644 | 42.205 |
| 19 | 0.0249825 | 0.0255425 | 6930 | 3.3264 | 55 | 1.616E-07 | 448 | 1.652E-07 | 2.24% | 656 | 42.992 |
| 20 | 0.0255425 | 0.0261900 | 7056 | 3.38688 | 56 | 1.622E-07 | 518 | 1.664E-07 | 2.53% | 773 | 50.659 |
| 21 | 0.0261900 | 0.0268200 | 7308 | 3.50784 | 58 | 1.606E-07 | 504 | 1.645E-07 | 2.41% | 779 | 51.053 |
| 22 | 0.0268200 | 0.0273800 | 7434 | 3.56832 | 59 | 1.617E-07 | 448 | 1.651E-07 | 2.09% | 704 | 46.137 |
| 23 | 0.0273800 | 0.0280450 | 7560 | 3.6288 | 60 | 1.623E-07 | 532 | 1.663E-07 | 2.43% | 851 | 55.771 |
| 24 | 0.0280450 | 0.0287450 | 7812 | 3.74976 | 62 | 1.609E-07 | 560 | 1.649E-07 | 2.50% | 926 | 60.686 |
| 25 | 0.0287450 | 0.0294650 | 7938 | 3.81024 | 63 | 1.623E-07 | 576 | 1.664E-07 | 2.50% | 968 | 63.439 |
| 26 | 0.0294650 | 0.0301650 | 8190 | 3.9312 | 65 | 1.612E-07 | 560 | 1.651E-07 | 2.38% | 971 | 63.638 |
| 27 | 0.0301650 | 0.0305000 | 8442 | 4.05216 | 67 | 1.601E-07 | 268 | 1.619E-07 | 1.11% | 476.96429 | 31.258 |
|  |  |  |  |  |  |  |  |  | (TOTAL) | 15645 | 1025.308 |

FIG.14

| Zone | Start R(m) | end R(m) | start address | NUMBER OF CARRIERS /TR | LINE VELOCITY (m/s) | NUMBER OF TRACKS /zone | DENSITY RATIO | NUMBER OF CLUSTERS | CAPACITY with spare(MB) | PLL M |
|---|---|---|---|---|---|---|---|---|---|---|
| -1 | 0.01570 | 0.01600 | FF10 | 4704 | 1.850 | 240 |  | 240 |  | 16 |
| 0 | 0.01600 | 0.01640 | 0000 | 4410 | 2.011 | 320 | 2.50% | 300 | 19.40 | 35 |
| 1 | 0.01640 | 0.01679 | 012C | 4536 | 2.004 | 308 | 2.35% | 297 | 19.20 | 36 |
| 2 | 0.01679 | 0.01721 | 0255 | 4662 | 1.995 | 336 | 2.50% | 333 | 21.56 | 37 |
| 3 | 0.01721 | 0.01763 | 03A2 | 4778 | 1.991 | 336 | 2.44% | 342 | 22.15 | 38 |
| 4 | 0.01763 | 0.01805 | 04F8 | 4914 | 1.988 | 336 | 2.38% | 351 | 22.74 | 39 |
| 5 | 0.01805 | 0.01850 | 0657 | 5040 | 1.984 | 364 | 2.52% | 390 | 25.30 | 40 |
| 6 | 0.01850 | 0.01892 | 07DD | 5166 | 1.985 | 336 | 2.27% | 369 | 23.92 | 41 |
| 7 | 0.01892 | 0.01940 | 094E | 5292 | 1.981 | 384 | 2.54% | 432 | 28.05 | 42 |
| 8 | 0.01940 | 0.01982 | 0AFE | 5418 | 1.984 | 336 | 2.16% | 387 | 25.10 | 43 |
| 9 | 0.01982 | 0.02031 | 0C81 | 5544 | 1.981 | 392 | 2.47% | 462 | 30.02 | 44 |
| 10 | 0.02031 | 0.02073 | 0E4F | 5670 | 1.985 | 336 | 2.07% | 405 | 26.28 | 45 |
| 11 | 0.02073 | 0.02122 | 0FE4 | 5796 | 1.982 | 392 | 2.36% | 483 | 31.39 | 46 |
| 12 | 0.02122 | 0.02164 | 11C7 | 5922 | 1.986 | 336 | 1.98% | 423 | 27.46 | 47 |
| 13 | 0.02164 | 0.02218 | 136E | 6048 | 1.983 | 434 | 2.51% | 558 | 36.31 | 48 |

FIG.15

| Zone | Start R(m) | end R(m) | start address | NUMBER OF CARRIERS /TR | LINE VELOCITY (m/s) | NUMBER OF TRACKS /zone | DENSITY RATIO | NUMBER OF CLUSTERS | CAPACITY with spare(MB) | NUMBER OF CLUSTERS |
|---|---|---|---|---|---|---|---|---|---|---|
| 14 | 0.02218 | 0.02274 | 159C | 6174 | 1.991 | 448 | 2.52% | 588 | 38.27 | 49 |
| 15 | 0.02274 | 0.02330 | 17E8 | 6300 | 2.001 | 448 | 2.46% | 600 | 39.06 | 50 |
| 16 | 0.02330 | 0.02386 | 1A40 | 6426 | 2.010 | 448 | 2.40% | 612 | 39.85 | 51 |
| 17 | 0.02386 | 0.02442 | 1CA4 | 6678 | 1.980 | 448 | 2.35% | 636 | 41.42 | 53 |
| 18 | 0.02442 | 0.02498 | 1F20 | 6804 | 1.989 | 448 | 2.29% | 648 | 42.21 | 54 |
| 19 | 0.02498 | 0.02554 | 21A8 | 6930 | 1.998 | 448 | 2.24% | 660 | 42.99 | 55 |
| 20 | 0.02554 | 0.02619 | 243C | 7056 | 2.006 | 518 | 2.53% | 777 | 50.66 | 56 |
| 21 | 0.02619 | 0.02682 | 2745 | 7308 | 1.986 | 504 | 2.41% | 783 | 51.05 | 58 |
| 22 | 0.02682 | 0.02738 | 2A54 | 7434 | 1.999 | 448 | 2.09% | 708 | 46.14 | 59 |
| 23 | 0.02738 | 0.02805 | 2D18 | 7560 | 2.007 | 532 | 2.43% | 855 | 55.77 | 60 |
| 24 | 0.02805 | 0.02875 | 306F | 7812 | 1.989 | 560 | 2.50% | 930 | 60.69 | 62 |
| 25 | 0.02875 | 0.02947 | 3411 | 7938 | 2.007 | 576 | 2.50% | 972 | 63.44 | 63 |
| 26 | 0.02947 | 0.03017 | 37DD | 8190 | 1.994 | 560 | 2.38% | 975 | 63.64 | 65 |
| 27 | 0.03017 | 0.03050 | 3BAC | 8442 | 1.980 | 268 | 1.11% | 480 | 31.33 | 67 |
| 28 | 0.03050 | 0.03075 | 3D8C | 8442 | 2.002 | 200 |  | 358 |  |  |
|  |  |  |  |  |  |  |  | 15756 | 1025.38 |  |

FIG.16

| 0 | 3 4 | 7 8 | 15 16 | 19 20 | 23 24 | 41 |
|---|---|---|---|---|---|---|
| Sync 4bit | CLUSTER H 4bit | CLUSTER M 8bit | CLUSTER L 4bit | SECTOR 4bit | BCH CODE PARITY 18bit | |

FIG.24A

| 0 | 3 4 | 11 12 | 19 20 | 27 28 | 41 |
|---|---|---|---|---|---|
| Sync 4bit | CLUSTER H 8bit | CLUSTER L 8bit | SECTOR 8bit | BCH CODE PARITY 14bit | |

FIG.24B

| Sync 4bit | CLUSTER H 8bit | CLUSTEr L 8bit | SECTOR 4bit | BCH CODE PARITY 18bit |

FIG.25

DISC-SHAPED RECORDING MEDIUM, MANUFACTURING METHOD AND MANUFACTURING DEVICE THEREOF, AND DATA RECORDING METHOD

TECHNICAL FIELD

This invention relates to a disc-shaped recording medium, having a track wobbled in keeping with the address information, a manufacturing method and apparatus therefor, and a data recording method.

This application claims priority of Japanese Patent Application No.2002-098044, filed in Japan on Mar. 29, 2002, the entirety of which is incorporated by reference herein.

BACKGROUND ART

An optical disc, approximately 64 mm in diameter, having a recording capacity capable of recording music sound signals for 74 minutes or longer, is currently in use. This small-sized optical disc, termed a Mini-Disc (registered trademark), is classified into a replay-only disc, having data recorded as pits, and a recording and/or reproducing disc, having data recorded by a magneto-optical recording (MO) system and which may thus also be reproducible. The following description is directed to a small-sized recording and/or reproducing disc, referred to below as an optical disc. With this optical disc, the track pitch, the recording wavelength of the recording laser light or the NA of the objective lens have come to be ameliorated in order to increase disc's recording capacity.

In the following explanation, an optical disc of an initial stage, in which groove recording is carried out with the track pitch of 1.6 $\mu$m, is termed the first generation MD. The physical format of this first generation MD is prescribed as follows: The track pitch is 1.6 $\mu$m and the bit length is 0.59 $\mu$m/bit. The laser wavelength $\lambda$ is set to $\lambda$=780 m and the numerical aperture of the optical head NA is set to NA=0.45. The recording system employed is the groove recording system in which a groove (i.e. a groove formed on the disc surface) is used as a track for recording and/or reproduction. The address system employed is a system employing the wobbled groove in which a single-spiral groove is formed on a disc surface and in which a wobble as the address information is formed on both sides of this groove. Meanwhile, in the present specification, the absolute address recorded by the wobbling is termed an ADIP (Address in Pre-Groove).

In the conventional Mini-Disc, an EFM (8 to 14 modulation) system is employed as the recording data modulating system. As the error correction system, ACIRC (Advanced Cross Interleave Reed-Solomon Code) is used. For data interleaving, a convolution type data interleaving is used. In this manner, data redundancy amounts to 46.3%.

In the first generation MD, the data detection system is a bit-by-bit system, while the disc driving system used is the CLV (Constant Linear Velocity) system. The linear velocity of the CLV system is 1.2 m/sec.

The standard data rate during recording and/or reproduction is 133 kB/sec, while the recording capacity is 164 MB (140 MB for MD-DATA). The minimum data re-write unit (cluster) is constructed by 36 sectors composed of 32 main sectors and four link sectors.

In these days, the next-generation MD, having a recording capacity further improved over the first generation MD, is being developed. Such an MD in which the medium is unchanged from the conventional medium (disc orb cartridge), and in which the modulation system or the logical structure is changed to provide for a double-density user area to increase the recording capacity to for example 300 MB is now contemplated. This MD is referred to below as the next-generation MD1. The physical parameters of the recording medium are the same, the track pitch is 1.6 $\mu$m, the laser light wavelength $\lambda$ is such that $\lambda$=780 nm and the numerical aperture of the optical head NA is such that NA=0.45. The recording system used is the groove recording system. The address system used is the ADIP. Thus, the structure of the optical system, ADIP address readout system and the servo processing in the disc driving device are similar to those of the conventional mini-disc.

An MD further improved in the recording capacity over the next-generation MD1 (next-generation MD2) is also being developed, in which the track pitch is reduced to 1.25 $\mu$m and in which a recording mark is detected by DWDD (Domain Wall Displacement Detection) from the aforementioned groove.

Meanwhile, if it is attempted to rotationally drive and thereby reproduce the next-generation MD2, in which the recording capacity has been increased by exploiting the DWDD, with the CLV (Constant Linear Velocity) in the same way as in reproducing the next generation MD1, the adverse effect ascribable to tracking offset becomes significant because the reproducing spot is larger than the mark. Specifically, if even the smallest tracking offset is produced, the result is that a mark from a neighboring track is also picked up, because of the narrow track pitch, thus significantly lowering the readout characteristics.

That is, with an optical disc, such as the next-generation MD2, which has the track pitch further narrowed and which is reproduced with ultra-high resolution by DWDD, it is necessary to cope with detracking extremely rigorously.

The next generation MD2 is also of the ADIP addressing system and, if the carrier frequency of the track is offset every track period by CLV, as shown in FIG. 1, the ADIP phase is also offset. With the next generation MD2, as in other MDs, the push-pull signal PP, detected with one spot, is detected and used as a tracking error signal. However, low frequency components of a few Hz appears as a beat component in the push-pull signal, as shown in FIG. 2. This push-pull signal is increased as a wobble push-pull signal WPP to the extent shown in FIG. 3. With the signal of the magnitude as large as that shown in FIG. 3, detracking is unavoidably produced in the next generation MD2.

DISCLOSURE OF THE INVENTION

It is an object of the present invention to provide a disc-shaped recording medium in which no low frequency components are superposed on the push-pull signal even in the above-described next generation MD2 in which the track pitch is narrower than that of the first generation MD and is 1.25 $\mu$m and in which the mark is detected from the groove by DWDD.

It is another object of the present invention to provide a method and apparatus for manufacturing a disc-shaped recording medium.

It is yet another object of the present invention to provide a method for recording data on a disc-shaped recording medium.

For accomplishing these objects, the present invention provides a disc-shaped recording medium wherein a signal recording surface of the disc-shaped recording medium is split into a plurality of zones and wherein a track(s) is formed spirally or concentrically such that, in each zone, the number of waves of a wobble is the same from one turn of the track(s) to the next.

The present invention also provides a method for manufacturing a disc-shaped recording medium wherein the speed of rotation of the disc-shaped recording medium, having a signal recording surface divided into a plurality of zones along the radial direction, is changed from one zone to the next, and wherein the wobble frequency is controlled so that, in each zone, the number of waves of the wobble of neighboring turns of the track(s) is the same from one turn of the track(s) to the next. The present invention also provides an apparatus for manufacturing a disc-shaped recording medium comprising disc rotating means for rotationally driving a disc-shaped recording medium having a signal recording surface divided into a plurality of zones along the radial direction, driving means for driving the disc rotating means, a phase synchronization circuit for generating optional clocks, and controlling means for controlling the driving means so that the speed of rotation of the disc-shaped recording medium is changed from one zone of the disc-shaped recording medium to the next and for controlling the phase synchronization circuit so that, in each zone, the number of waves of the wobble of optional two neighboring turns of the track(s) is equal from one zone of the disc-shaped recording medium to the next.

The present invention also provides a data recording method in which, in recording data on a disc-shaped recording medium, having a signal recording surface divided into a plurality of zones along a radial direction, the recording medium including a track(s) formed spirally or concentrically so that, in each zone, the number of waves of a wobble is equal from one turn of the track(s) to the next, recording of the data is inhibited in the vicinity of a boundary between neighboring zones.

Other objects, features and advantages of the present invention will become more apparent from reading the embodiments of the present invention as shown in the drawings.

BRIEF DESCRIPTION OF THE DRAWINGS

FIG. 13 shows the former half of a first specified embodiment of the zone layout formed by the constant in-zone density ratio system.

FIG. 14 shows the latter half of the first specified embodiment of the zone layout formed by the constant in-zone density ratio system.

FIG. 15 shows the former half of a second specified embodiment of the zone layout formed by the constant in-zone density ratio system.

FIG. 16 shows the latter half of the second specified embodiment of the zone layout formed by the constant in-zone density ratio system.

FIGS. 24A and 24B show a data structure of the ADIP.

FIG. 25 illustrates the processing of embedding a disc control signal in the ADIP signal of the next generation MD2.

BEST MODE FOR CARRYING OUT THE INVENTION

Figure 1:
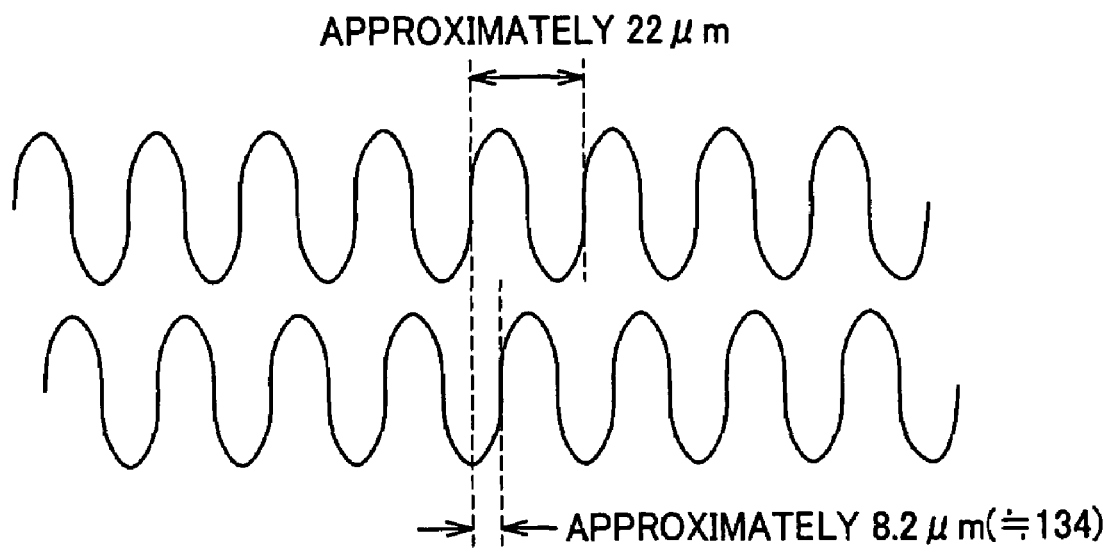
FIG. 1 shows the manner of progressive track carrier frequency deviation.
Figure 2:
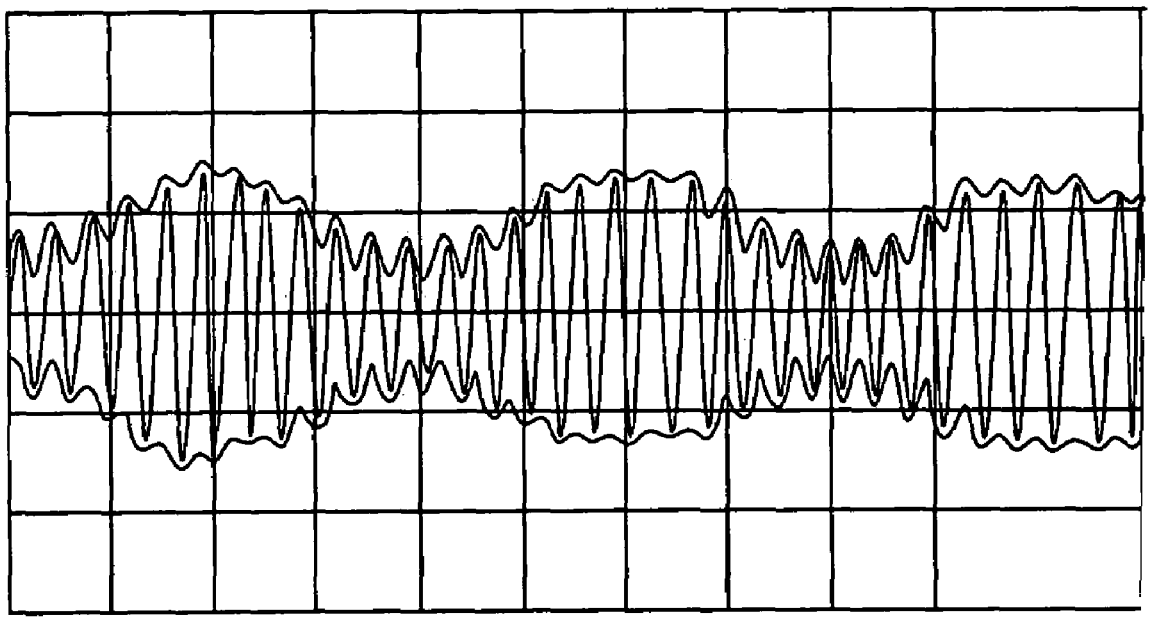
FIG. 2 depicts low frequency components (beat components) of a few Hz superposed on a push-pull signal.

Referring to the drawings, preferred embodiments of the present invention are hereinafter explained.

Figure 3:
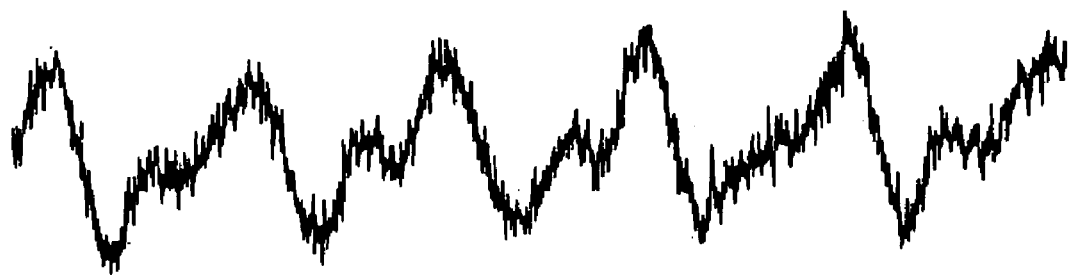
FIG. 3 depicts a waveform of a WPP signal.
Figure 4:
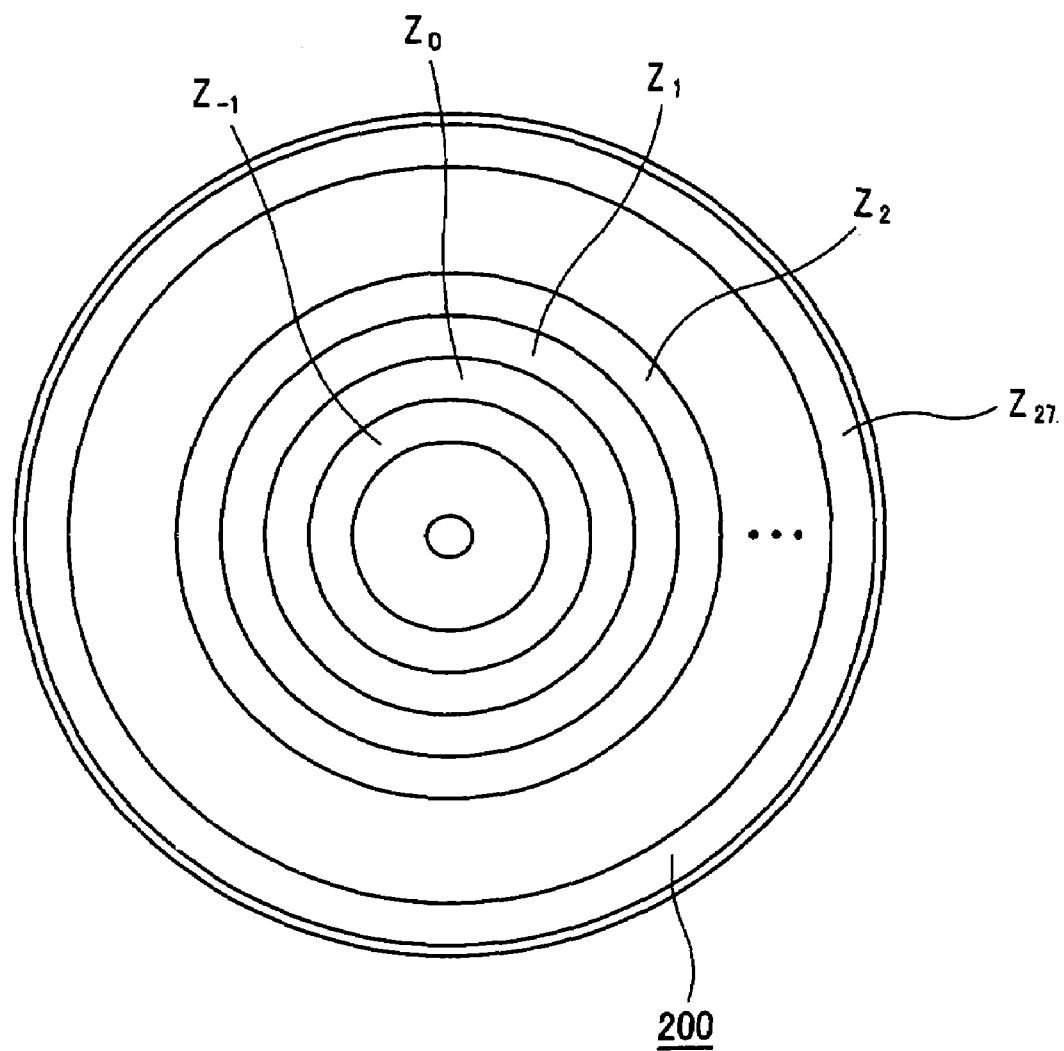
FIG. 4 depicts zone splitting of an optical disc.
Figure 5:
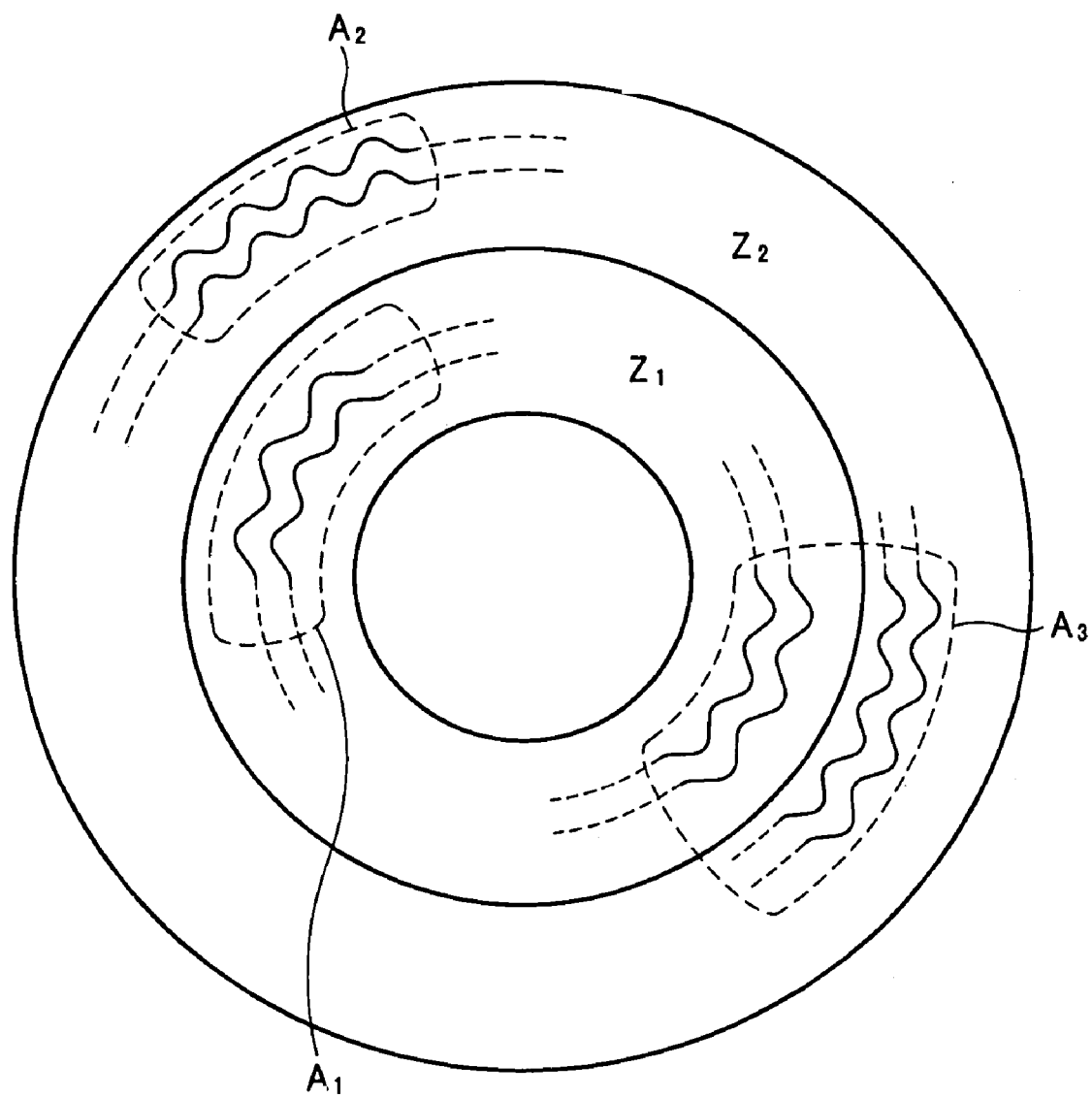
FIG. 5 shows the manner in which the number of waves of the wobble is made coincident in a given zone and non-coincident from zone to zone.
Figure 6:
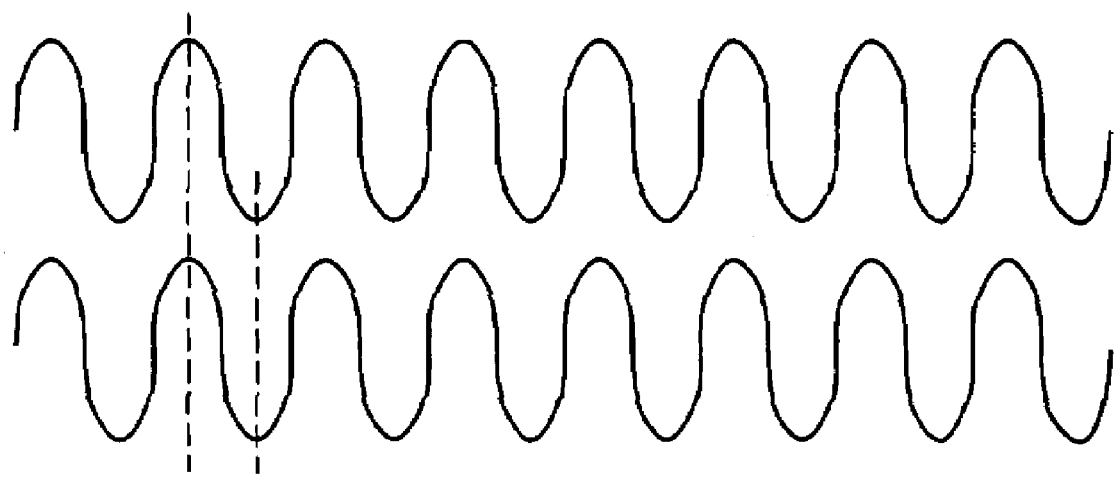
FIG. 6 shows the manner in which the number of waves is made equal from one turn of a track to the next or from one track to the next.
Figure 7:
FIG. 7 is a waveform diagram of a WPP signal.

FIG. 4 shows a zoned format of an optical disc 200 such as the next generation MD2. In this optical disc 200, the surface of the optical disc is divided into 28 zones of from $Z_0$ to $Z_{27}$. In a given zone, the number of waves (phase) of a given track is made coincident with that of a neighboring track. For example, in FIG. 5, showing the zones $Z_1$ and $Z_2$ to an enlarged scale, the number of waves (phase) of the wobble is made coincident, in the zone $Z_1$, as indicated by an encircled area $A_1$. In the zone $Z_2$, the number of waves (phase) of the wobble is again made coincident, as indicated by an encircled area $A_2$. FIG. 6 shows the wobble in the area $A_1$ as taken out and that in an area $A_2$ as taken out. The numbers of waves in these areas coincide with each other. This is tantamount to equating the number of waves of the ADIP carrier. This enables inphaseoutphase matching on an average, such that the WPP signal shown in FIG. 7 is of a magnitude smaller than that shown in FIG.3. Meanwhile, the number of waves (phase) of the wobble of the zone $Z_1$ need not be coincident with that of the zone $Z_2$ neighboring to the zone $Z_1$, as indicated by an encircled area $A_3$.

In the same zone of the optical disc 200, the reproduction is by CAV. However, for the recording and/or reproducing apparatus, the reproduction appears to be the same as that when the spindle motor is controlled as conventionally to rotationally drive the disc by CLV. This disc driving system is termed the ZCAV system.

The next generation MD2 is now explained. The next generation MD2 is a recording medium which applies the high density recording technique, such as the DWDD (Domain Wall Displacement Detection), and differs from the above-described conventional Mini-Disc or the next generation MD1 as to the physical format. The next generation MD2 has a track pitch of 1.25 μm and a bit length of 0.16 μm/bit, and is increased in density along the line direction.

For compatibility with the conventional Mini-Disc and with the next generation MD1, the standard for the optical system, readout system or the servo processing are in keeping with the conventional standard, such that the laser wavelength λ=780 nm and the numerical aperture NA=0.45. The recording system is the grooved recording system, while the addressing system is the system exploiting the ADIP. As for the outer shape of the casing, the standard for the conventional Mini-Disc and the next generation MD1 applies.

However, in case the track pitch narrower than that of the conventional practice and the line density (bit length) are to be read out using an optical system equivalent to that of the conventional Mini-Disc and the next generation MD1, it is necessary to resolve constraint conditions in e.g. detracking margin, crosstalk from the land or the groove, defocusing, or CT signals. Consequently, the next generation MD2 is featured by changes made in groove depth, inclination or width. Specifically, the depth, inclination and width of the groove are set to 160 to 180 nm, 60° to 70° and to 600 to 800 nm, respectively.

The next generation MD2 employs, as a recording data modulation system, the RLL (1–7) PP modulation system (RLL; Run Length Limited, PP; Parity preserve/Prohibit rmtr (repeated minimum transition runlength)), suited to high density recording, while employing, as the error correction system, an RS-LDC (Reed Solomon-Long Distance Code) system with BIS (Burst Indicator Subcode) having a higher correction capability. Deinterleaving is a block completion type. By this, data redundancy is 20.50%. The data detection system is the viterbi decoding system by PR (1, −1) ML. The cluster, as a minimum data rewrite unit, is formed by 16 sectors, 64 kB.

The disc driving system used in the ZCAV system of the present invention, with the linear velocity being 2.0 m/sec. The standard data rate in recording and/or reproduction is 9.8 MB/sec. Thus, with the next generation MD2, the total recording capacity can be 1 GB by employing the DWDD system and this driving system.

Figure 8:
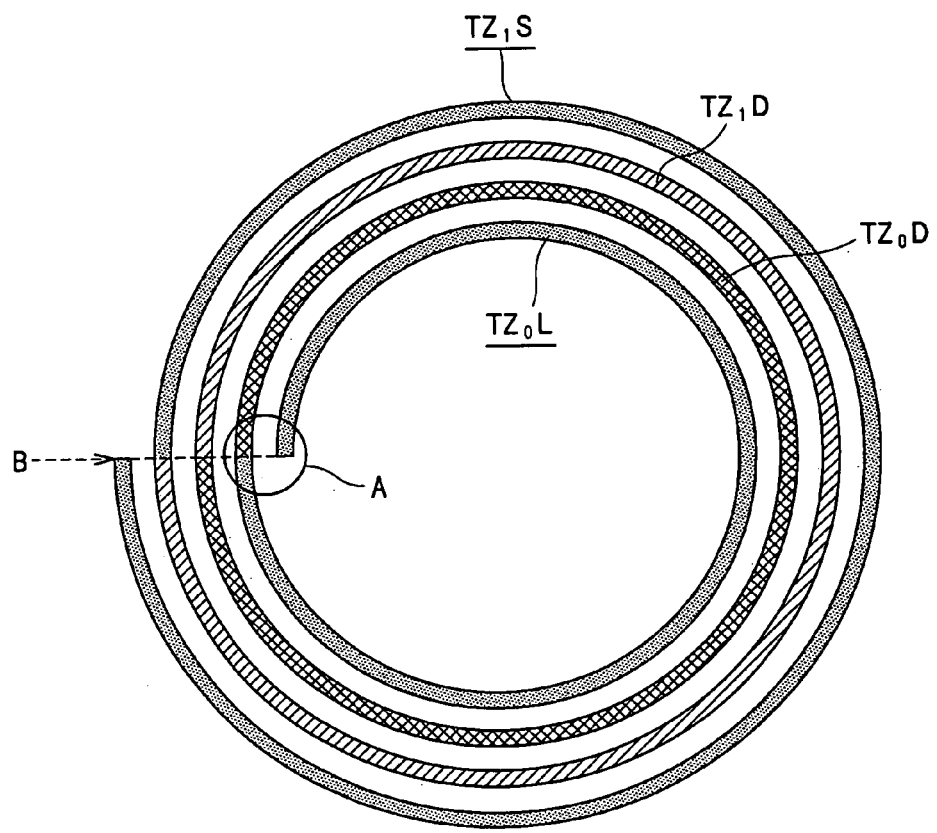
FIG. 8 shows a track structure in the vicinity of a zone-to-zone junction.

FIG. 8 shows a track structure of in the vicinity of a junction between neighboring zones. Two dummy tracks are inserted between the trailing track $TZ_0L$ of the zone $Z_0$ and the leading track $TZ_1S$ of the zone $Z_1$. These dummy tracks are a dummy track $TZ_0D$ of a carrier frequency equivalent to the carrier frequency of the zone $Z_0$ and a dummy track $TZ_1D$ of a carrier frequency equivalent to the carrier frequency of the zone $Z_1$. The innermost rim and the outermost rim of at least two tracks is composed of two clusters and four clusters, respectively. The junctions are discontinuous and are not used for recording and/or reproduction. Although the ADER holds in one junction sector in an area A in FIG. 8, this is a dummy cluster and hence is not problematical. The junctions are arrayed on the same radial line indicated by an arrow B.

Figure 9:
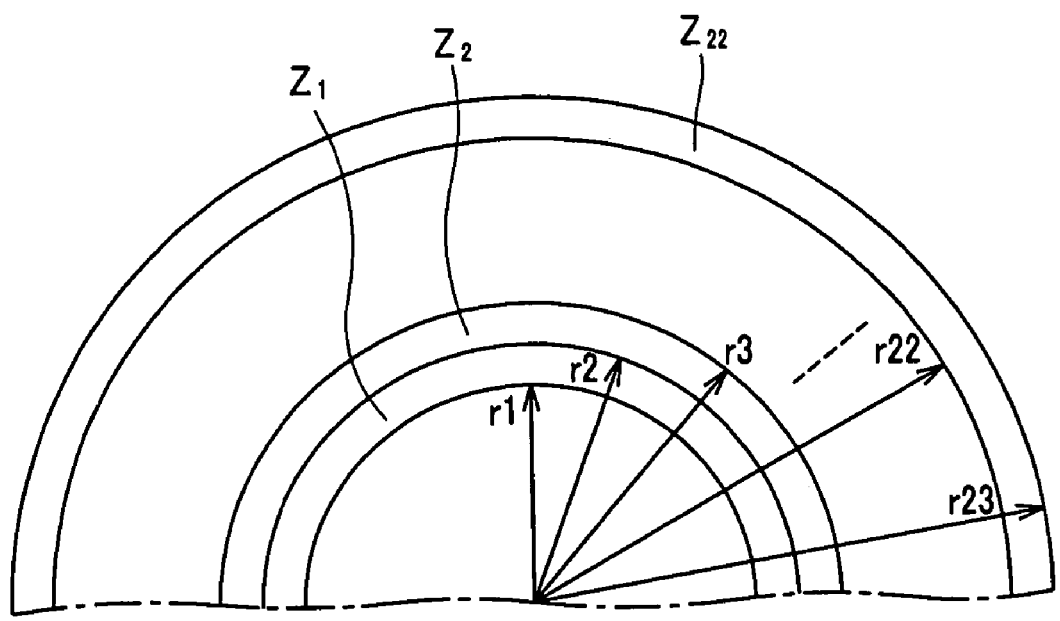
FIG. 9 illustrates that the density ratio in each zone is substantially uniform.

A specified example of zone allocation is hereinafter explained. Here, a constant in-zone density ratio system is explained. In this system, the ratio between the inner radius and the outer radius is adapted to be constant. For example, assume that the radius up to the inner rim and that up to the outer rim of the zone $Z_1$ are r1 and r2, respectively, while the radius up to the inner rim and that up to the outer rim of the zone $Z_2$ are r2 and r3, respectively, as shown in FIG. 9. Also assume that the radius up to the inner rim and that up to the outer rim of the zone $Z_{22}$ are r22 and r23, respectively. The zone splitting is made so that the equation r2/r1=r3/r2= . . . r23/r22 holds, so that the in-zone density ratio system is constant. With this in-zone density ratio system, priority is on RF characteristics.

If the next generation MD2 has a track pitch of 1.25 μm and the maximum linear density is 0.16 μm/bit, and the number of zones is 27, the number of tracks/zone is 268 to 576, while the number of clusters/zone is 297 to 975. The line density is 0.1602 to 0.1667 μm/bit. As a result, the recording capacity is 1.025 G (109). With the number of zones of 27, the zone-to-zone speed offset is 2.54%. The number of clusters/zone is a number excluding four cluster breakages and four cluster interchanges. The recording capacity is a value excluding the interchange recording unit. The recording capacity is a value excluding the exchange recording unit.

Figure 10:
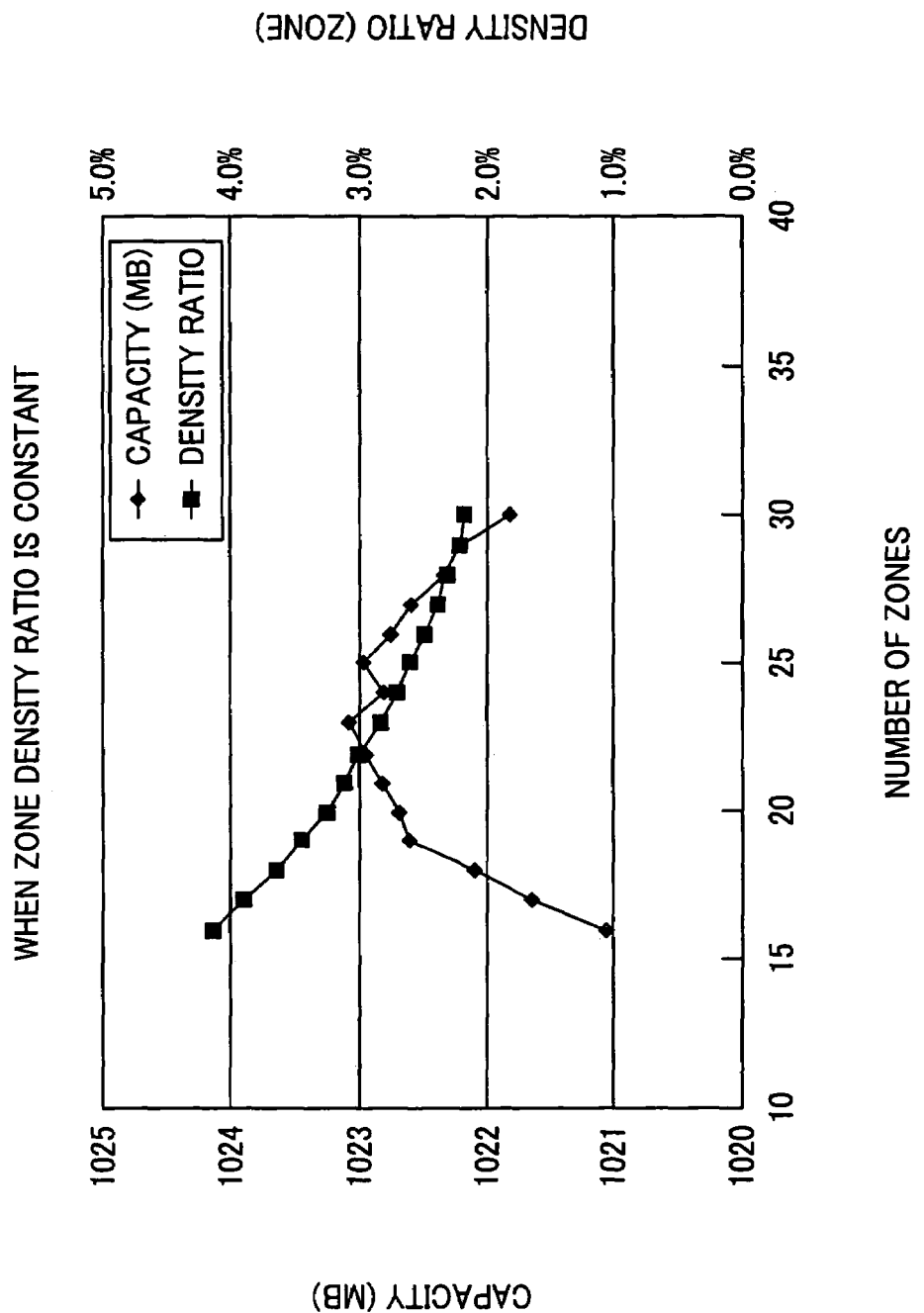
FIG. 10 shows the relationship between the number of zones, density ratio and the zone-to-zone speed offset.

FIG. 10 shows the relationship between the number of zones, recording capacity and the density ratio or the zone-to-zone speed offset. It may be seen that the number of zones of from 23 to 28 is an optimum range.

With this in-zone density ratio system, the zone-to-zone speed offset when an optical head traverses a boundary between two neighboring zones is of a small value not larger than 3%, so that the number of revolutions of the spindle motor may be changed smoothly. That is, in a given zone, the spindle motor is being run in rotation at a constant velocity. A rotationally driving controller does not see this in such a manner that it is rotationally driving the disc at CAV in a given zone, but rather see this in such a manner that the rotationally driving controller is rotationally driving the disc in an attempt to make the carrier frequency of the ADIP constant.

Figure 11:
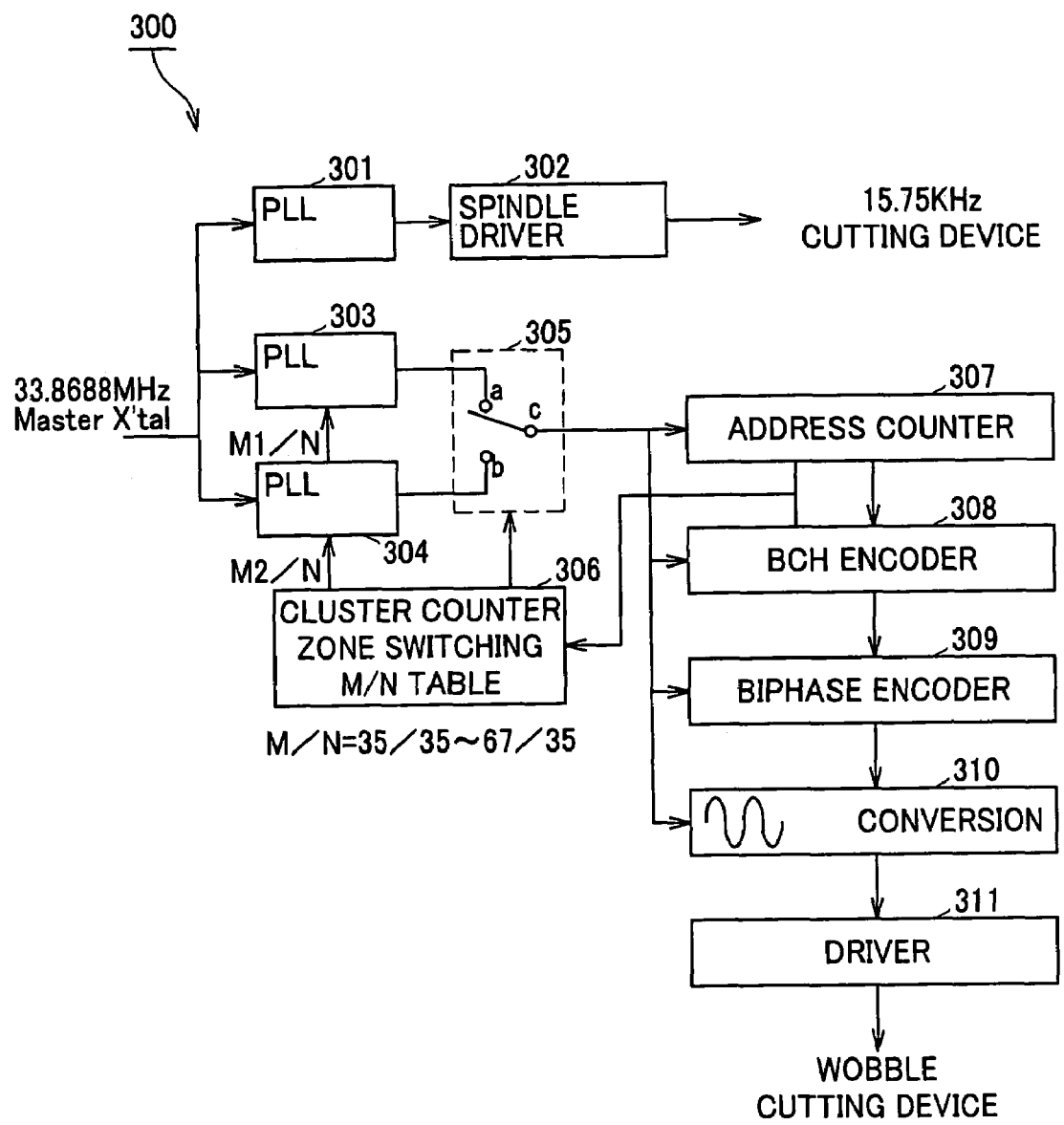
FIG. 11 is a block diagram of a formatter used in the process of manufacturing the next generation MD2 by ZCAV.

FIG. 11 shows the structure of a formatter 300 used in a process of manufacturing the next generation MD2 rotationally driven at ZCAV. In producing a disc, usually a disc is rotated at CAV, and a wobble is formed as the frequency is changed. To this end, the formatter 300 includes two circuits of the PLL, each for a zone, that is a PLL 303 and PLL 304, and clocks for zone cutting are changed, without producing interruptions, by switching between these PLLs 303 and 304.

When a disc is CAV—cut at 900 rpm, the PLL 301 generates, from master clocks (33.8688 MHz), a frequency of 15.75 kHz for synchronizing the FG of the spindle motor, to route the so produced frequency to a spindle driver 302. This spindle driver 302 sends this frequency of 15.75 kHz to a cutting apparatus.

The PLL 303 and the PLL 304 are used for generating an ADIP wobble frequency from the master clock (33.8688 MHz).

A cluster counter zone switching M/N table 306 has stored therein M/N=36/35~67/35. In order to create the ADIP wobble frequency between neighboring zones, without interruptions, M2/N and M1/N are supplied to the PLL 304 and to the PLL 303, respectively.

A changeover switch 305 switches between clocks from the PLL 303 and those from the PLL 304, under control by the cluster counter zone switching M/N table 306.

An address counter 307 counts up an address of an inner zone. A BCH encoder 308 appends ECC to a count output. A bi-phase encoder 309 bi-phase encodes an ECC-appended output. An FM converter 310 frequency-modulates the bi-phase output into a sine wave which is routed to a driver 311. This driver 311 routes the sine wave signal to a wobble cutting apparatus.

An optical head of the wobble cutting apparatus illuminates a laser light beam on a master disc, having its surface coated with a photoresist, as the laser light beam is wobbled in keeping with a supplied FM signal. The master disc is run in rotation by a spindle motor at this time at CAV, from zone to zone, and clocks are changed over by the PLL 303 and PLL 304, with a zone-to-zone speed offset when the optical head traverses a boundary between two neighboring zones, which speed offset is small and is 3% or less. The surface of the master disc is sensitized and developed to the shape of wobbled grooves corresponding to the address information. The wobbling groove is formed on the developed master disc and a land is formed between neighboring grooves. A stamper is manufactured from this master disc and, using this stamper, a large number of optical discs, as replica discs, as the next generation $MD_2$, are produced. The above is a specified example of the method and the apparatus for manufacturing the optical disc of the present invention.

Figure 12:
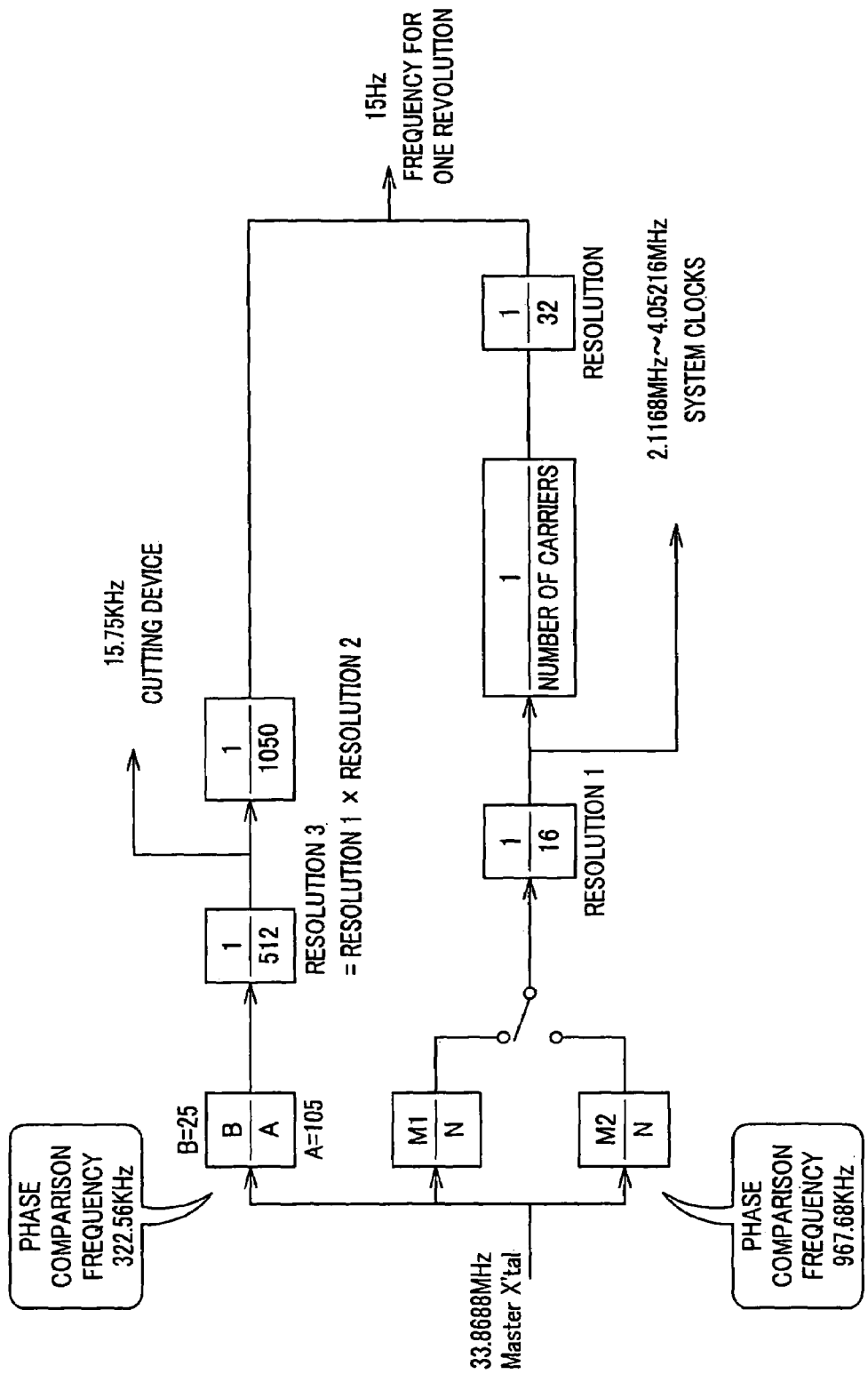
FIG. 12 shows a structure for calculating the frequency in the PLL of the formatter.

FIG. 12 shows an arrangement for calculating the frequency by the PLL 301, PLL 303 and the PLL 304. The arrangement allows for clock synchronization once each complete revolution of the master disc. That is, if the format is such that switching occurs at the same position as this clock synchronization position, zone switching free from phase deviation may be achieved. To this end, the PLL 301 multiplies 33.8688 MHz by 25/105 and further multiplies the resulting frequency by 1/512 with the resolution 3=resolution 1×resolution 2 (as will be explained later) to yield 15.75 kHz which is supplied to a cutting device.

The PLL 303 multiplies 33.8688 MHz by M1/N. The driver condition in this case is to set M/N to unity (1), to set the phase comparison frequency to not less than 1 MHz and to suppress the master clocks to 50 MHz or less. In the zone $Z_0$, M/N being set to unity denotes M=N, such that, in case the CLV mode is used, the PLL may be dispensed with. The phase comparison frequency is set to 1 MHz or higher because the phase is determined from channel clocks and hence the clocks may be distinct from master clocks.

The PLL 304 multiplies 33.8688 MHz by M2/N, provided that the PTOC portion represented by ADIPU is multiplied by 16/15 so that one cluster is comprised in one complete revolution of the master disc.

With the resolution 1 in the changeover switch 305, the clocks changed over are multiplied by 1/16 to generate system clocks of 2.1168 MHz to 4.05216 MHz. These clocks are then divided by the number of carriers and multiplied by 1/32 with the resolution 2 to generate 15 Hz which is the frequency for one complete revolution. The resolution 2 is the resolution for wobble generation. In case of 1/64, the 1/16 frequency division of the preceding stage is changed to 1/8. This doubles the frequency of the system clocks.

Meanwhile, the arrangement by PLL is used for such a case that the dive is used at CAV in future. Although the next generation MD2 is adapted to be usable for CLV as well for assuring compatibility to the first generation MD and for the next generation MD1, the next generation MD2 is adapted for being used conveniently for an apparatus intrinsically run in rotation at CAV.

For satisfying the condition of the arrangement shown in FIG. 12, the following conditions need to be met from zone to zone:

$M/N \times (1/(\text{number of carriers per track})) = 1/1050$  Condition 1

It is possible to generate clocks by clock synchronization being enabled every period and by provision of a PLL capable of M/N multiplication. This means that a simpler arrangement may be used in case the master disc is run in rotation by a drive at CAV to change over the clocks, instead of simply using the arrangement as a formatter. The arrangement may be further improved in flexibility by adding a PLL of B/A in a portion corresponding to 1/1050 on the right side of the above equation.

(number of carriers per track× number of tracks per zone)/(number of carriers per recording unit)=integer:  Condition 2

That is, the total number of carriers per zone is divisible by the recording unit, as the unit of recording and/or reproduction, whereby switching may be made in continuation to the next zone. In the format of the present specified example, the number of carriers per recording unit is 4704.

FIGS. 13 and 14 shows a first specified example of a zone layout formed by the in-zone density ratio system, while FIGS. 15 and 16 show a second specified example thereof. The number of carriers of the zone $Z_{-1}$ is 4704. The number of carriers per complete revolution is designed to be completely divisible by one cluster in one complete revolution. The reason is that a fixed pattern is written in the zone $Z_{-1}$ and hence correction may be made at any optional time to the correct number of carriers by reverting to this zone $Z_{-1}$ even though the disc is skewed as a result of interference.

Meanwhile, the reason that the density ratio when the optical head is astride the boundary between neighboring zones is set to 3% or less is that the PLL pull-in range is +4% and that, if the density ratio is less than this, the arrangement may be moved as the PLLs are changed over continuously.

Figure 17:
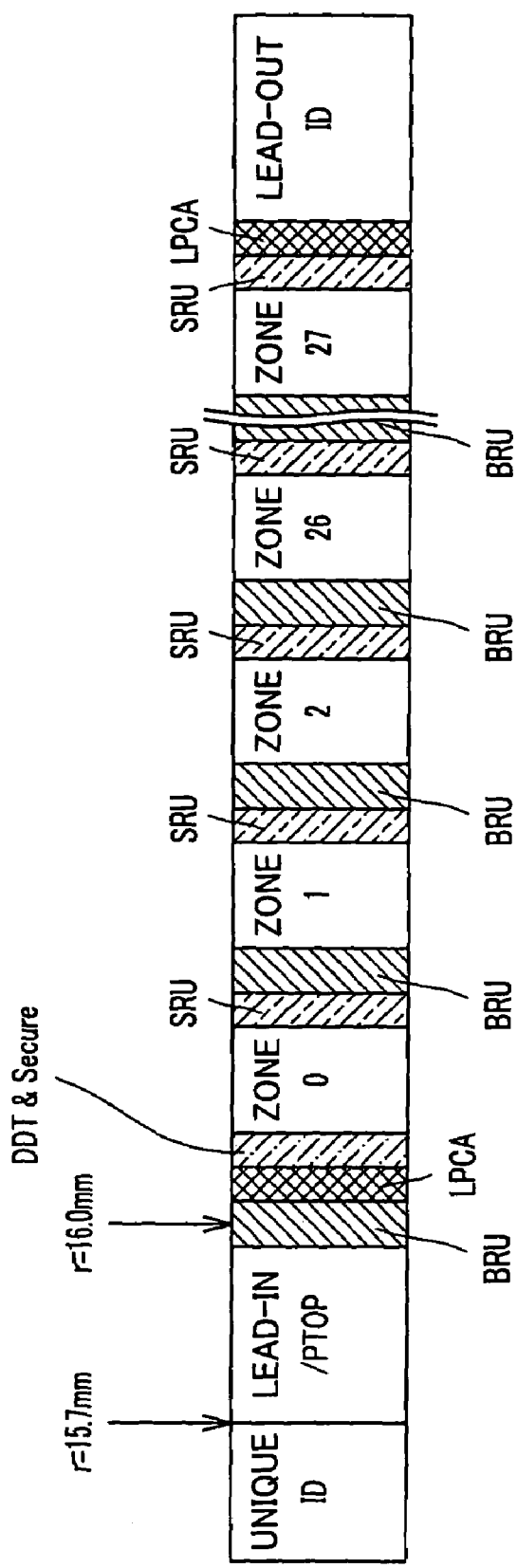
FIG. 17 shows a data format on the disc in accordance with the zone layout shown in FIGS. 15 and 16.

FIG. 17 shows a data format on a disc in accordance with the zone layout shown in FIGS. 15 and 16. In an area from the inner rim up to a radius of 15.7 μm, a unique ID is recorded by MO and, in an area from this area up to a radius of 16.0 mm, there is recorded a lead-in/PTOP (zone $Z_{-1}$). BRU is a buffer recording unit. LPCA is a laser power calibration area. In DDT (Disc Description Track) & Secure Area, there are stated the information on the disc sort, design disc parameters or the information required for security management. Next to this information, there are recorded zones $Z_0, Z_1, \ldots,$ zone $Z_{26}$, accompanied by spare recording units (SPUs) and BRUs. Between the last zone $Z_{27}$ and the lead-out are inserted the SRU and LPCA.

Figure 18:
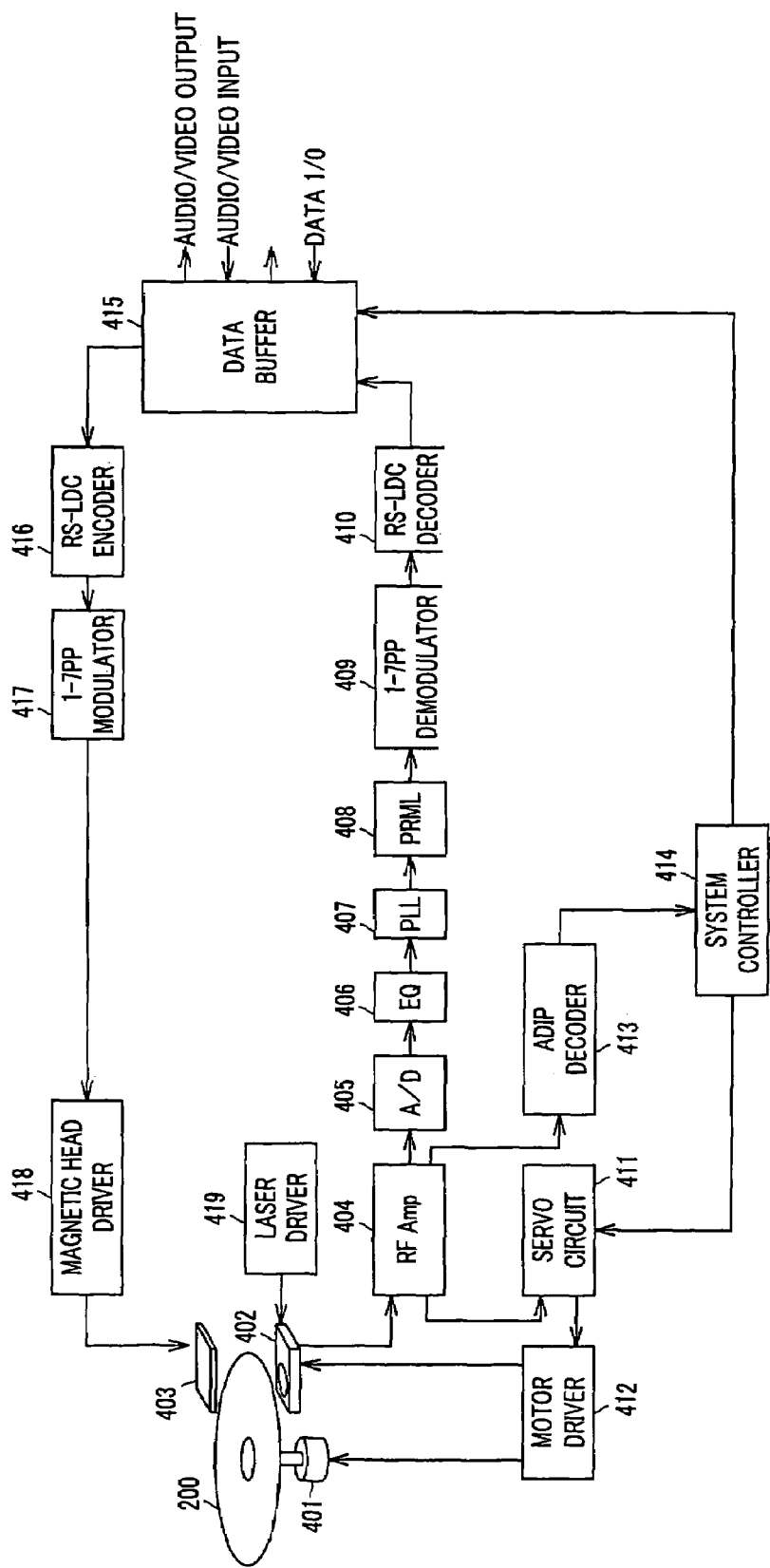
FIG. 18 is a block diagram showing an optical disc recording and/or reproducing apparatus for recording and/or reproducing information signals for the next generation MD2 of the ZCAV system.

Referring to FIG. 18, an optical disc recording and/or reproducing apparatus for recording and/or reproducing information signals for the above-described next generation MD2 of the ZCAV system, is hereinafter explained.

This optical disc recording and/or reproducing apparatus includes an arrangement for executing the RLL (1-7) PP modulation RS-LDC encoding, for recording the next generation MD2, while also including an arrangement for executing the RLL (1-7) demodulation RS-LDC decoding based on data detection employing PR (1, −1) ML and viterbi decoding for reproducing the next generation MD2.

This optical disc recording and/or reproducing apparatus rotationally drives the next generation MD2 (200), loaded in position, by a spindle motor 401, in accordance with the aforementioned ZCVA system. In recording and/or reproduction, laser light is illuminated from an optical head 402 to the next generation MD2 (200).

The optical head 402 outputs high level laser light for heating the recording track to the Curie temperature, at the time of recording, while outputting the laser light of a lower level for detecting data from the reflected light by the magnetic Kerr effect, at the time of reproduction. To this end, the optical head 402 has loaded thereon an optical system, such as a laser diode, as laser outputting means, a polarizing beam splitter or an objective lens, and a detector for detecting the reflected light. The objective lens, provided to the optical head 402, is held for displacement by for example a biaxial actuator along the radius of the disc and in a direction towards and away from the disc.

A magnetic head 403 is arranged on the opposite side to the optical head 402 with respect to the next generation MD2. The magnetic head 403 applies a magnetic field, modulated by recording data, to the next generation MD2. There are also provided a sled motor and a sled mechanism, not shown, for causing movement of the optical head 402 in its entirety and the magnetic head 403 along the radius of the disc. In this magneto-optical recording and/or reproducing apparatus, there are also provided a recording processing system, a reproducing processing system and a servo system, in addition to the recording and/or reproducing head system by the magnetic head 403 and the disc rotational driving system by the spindle motor 401. As a recording processing system, there is provided a circuit unit responsible for RLL (1-7) PP modulation and RS-LDC encoding at the time of recording on the next generation MD2.

As a reproducing processing system, there are provided a unit for demodulation associated with the RLL (1-7) PP modulation (RLL (1-7) demodulation based on data detection employing PR (1, −1) ML and viterbi decoding at the time of reproducing the next generation MD2) and a unit for executing RS-LDC decoding.

The information detected as reflected light of the laser light illuminated by the optical head 402 on the next generation MD2 (optical current obtained on detecting the reflected laser light by the photodetector) is sent to an RF amplifier 404. The RF amplifier 404 performs current to voltage conversion, amplification and matrix calculations on the detected information and extracts the replay RF signals, tracking error signals TE, focusing error signals FE or the groove information (ADIP information recorded by track wobbling on the next generation MD2) as the replay information.

At the time of reproducing the next generation MD2, the replay RF signals, obtained by the RF amplifier, are processed by an RLL (1-7) PP demodulating unit 409 and an RS-LDC decoder 410, via an A/D converting circuit 405, an equalizer 406, a PLL circuit 407 and a PRML circuit 408. In reproducing the replay RLL signal, replay data, as a RLL (1-7) codestring, is obtained by data detection employing PR (1, −1) ML and viterbi decoding, in a RLL (1-7) PP demodulating unit 409 and RLL (1-7) demodulating processing is carried out on this RLL (1-7) codestring. Error correction and deinterleaving processing are then carried out in an RS-LDC decoder 410. The resulting demodulated data is then output to a data buffer 415 as replay data from the next generation MD2.

The tracking error signals TE and the focusing error signals FE, output from the RF amplifier 404, are routed to a servo circuit 411, while the groove information is supplied to an ADIP decoder 413.

The ADIP decoder 413 limits the bandwidth of the groove information by a band-pass filter to extract wobble components, and subsequently performs frequency demodulation and bi-phase demodulation to extract the ADIP address. The demodulated ADIP address, as the absolute address information on the disc, is supplied to a system controller 414, as being the next generation MD2 address.

The system controller 414 executes preset control processing, based on the ADIP address. The groove information is returned to the servo circuit 411 for spindle servo control.

Based on an error signal, obtained on integrating a phase error of the replay clocks (PLL based clocks at the time of decoding) with respect to the groove information, the servo circuit 411 generates a spindle error signal for ZCAV servo control.

The servo circuit 411 generates a variety of servo control signals (tracking control signals, focusing control signals, sled control signals or spindle control signals) based on the spindle error signals, tracking error signals and focusing error signals, supplied from the RF amplifier 404, a tracking jump command or an access command from the system controller 414, to output the so generated control signals to a motor drive 412. Specifically, the servo circuit 411 performs necessary processing, such as phase compensation processing, gain processing or target vale setting, on servo error signals or commands, to generate a variety of servo control signals.

The motor drive 412 generates preset servo driving signals, based on servo control signals supplied from the servo circuit 411. The servo driving signals prove biaxial driving signals (two signals of focusing signals and tracking signals) actuating a biaxial mechanism, sled motor driving signals, actuating the sled mechanism, and spindle motor driving signals, actuating the spindle motor 401. By these servo driving signals, focusing control and tracking control are performed on the next generation MD2, while ZCAV control is performed on the spindle motor 401.

When the recording operation is performed on the next generation MD2, high density data are supplied from a memory transfer controller, not shown, or usual compressed ATRAC data are supplied from an audio processing unit.

In recording on the next generation MD2, an RS-LDC encoder 416 and an RLL (1-7) PP modulating unit 417 are in operation. In this case, the high density data are interleaved and added by an error correction code of the RS-LDC system in the RS-LDC encoder 416 and RLL (1-7) modulated by the RLL (1-7) PP modulating unit 417.

The recording data, modulated into an RLL (1-7) codestring, is supplied to a magnetic head driver 418 to cause the magnetic head 403 to apply a magnetic field corresponding to the modulated data to the next generation MD2 to record the data.

A laser driver/APC 419 causes a laser diode to perform a laser light emitting operation during reproduction and during recording, as described above, and also performs so-called APC (Automatic Laser Power Control). Specifically, there is provided a detector for laser power monitoring within the optical head 402. These monitor signals are fed back to the laser driver/APC 419. This laser driver/APC 419 compares the current laser power, obtained as a monitor signal, to a pre-set laser power, and causes an error therebetween to be reflected in a laser driving signal to manage control such that the laser power output from the laser diode will be stabilized at a setting value. It is noted that the value of the laser power, in terms of the replay laser power and the recording laser power, are set by the system controller 414 in an internal register of the laser driver/APC 419.

The system controller 414 controls the various components so that above-described various operations (accessing, various servo operations, data write and data readout operations) are executed.

The next generation MD2, in which zone allocation has been made in accordance with the in-zone density ratio system, may be run in rotation by the optical disc recording and/or reproducing apparatus in accordance with the ZCAV system.

Thus, the number of waves of the ADIP carrier is uniformed in a given zone to suppress the low frequency beat components from the ADIP wobble to a smallest possible value, while it appears to the drive as if the disc is being rotated in accordance with the CLV system.

Thus, even with the magneto-optical recording and/or reproducing apparatus of the type intrinsically actuating the first generation MD or the next generation MD1 by the CLV system, it is possible to rotationally drive the next generation MD2 to record/reproduce the information.

Figure 19:
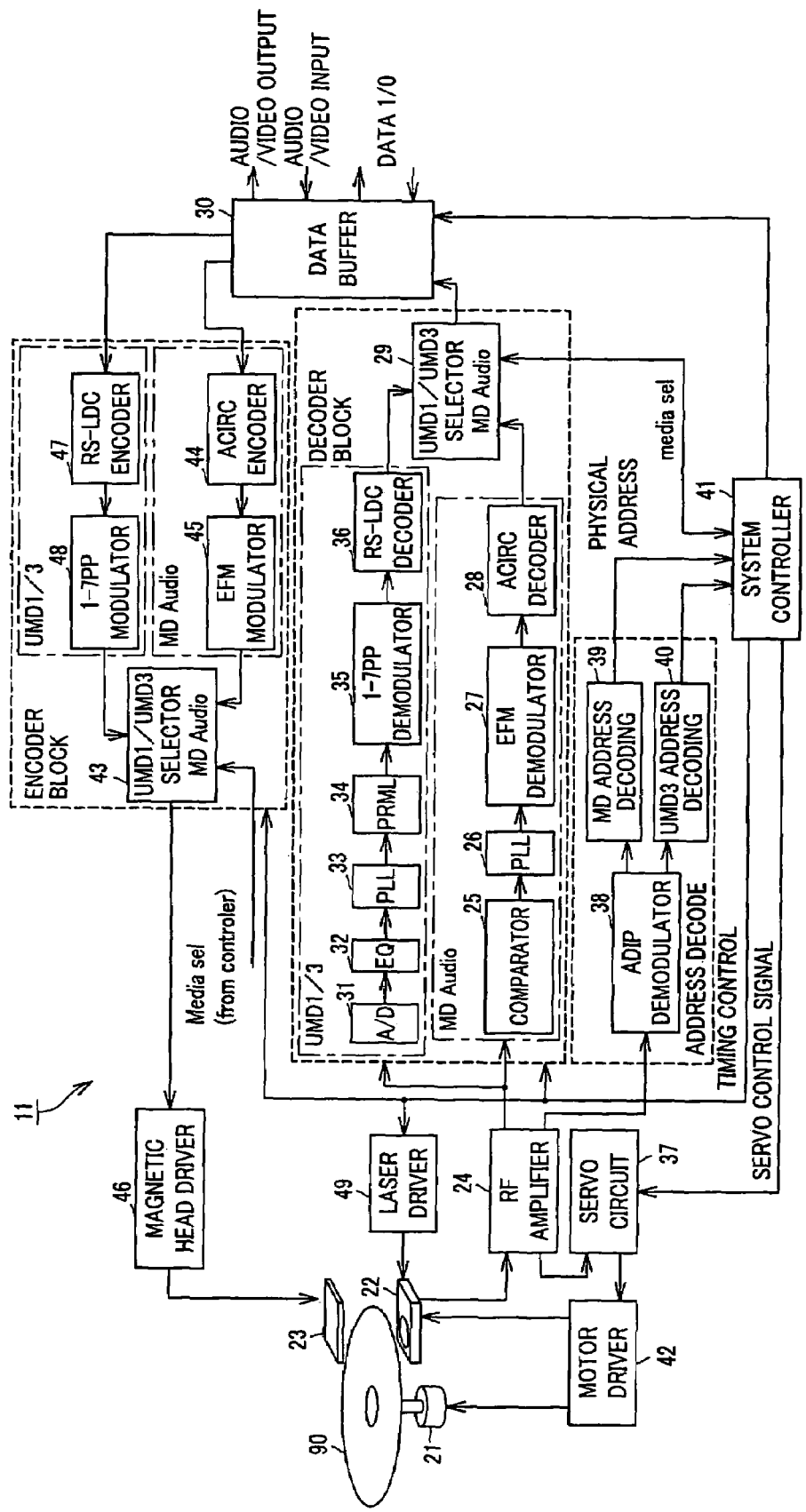
FIG. 19 is a block diagram showing the structure of an optical disc recording and/or reproducing apparatus for recording and/or reproducing the Mini-Disc (first generation MD), next generation MD1 and the next generation MD2.

FIG. 19 shows an arrangement of an optical disc recording and/or reproducing apparatus 11 for recording and/or reproducing the conventional Mini-Disc (first generation MD), next generation MD1 and the next generation MD2. This optical disc recording and/or reproducing apparatus 11 discriminates the next generation MD1 and the next generation MD2 from each other. There are occasions where the optical disc recording and/or reproducing apparatus 11 discriminates first generation MD and the second generation MD2 from each other.

The optical disc recording and/or reproducing apparatus 11 is featured by including, for recording and/or reproducing the conventional Mini-Disc, next generation MD1 and the next generation MD2, an arrangement for executing EFM modulation and ACIRC encoding for recording the conventional Mini-Disc and an arrangement for executing the RLL (1-7) PP modulation and RS-LDC encoding for recording the next generation MD1 and the next generation MD2. The optical disc recording and/or reproducing apparatus 11 is also featured by including, as a replay processing system, an arrangement for executing EFM demodulation and ACIRC decoding for reproducing the conventional Mini-Disc and an arrangement for executing RLL (1-7) demodulation RS-LDC decoding based on data detection employing PR (1, 2, 1) ML, PR (1, -1) ML and viterbi decoding for reproducing the next generation MD1 and the next generation MD2.

In the recording and/or reproducing apparatus 11, a disc 90 loaded thereon is rotationally driven by the spindle motor 21 in accordance with the CLV system or the ZCAV system. During recording and/or reproduction, laser light is illuminated from the optical head 22 on the disc 90.

The optical head 22 outputs high-level laser light for heating the recording layer on the recording track to the Curie temperature during recording, while outputting laser light of a relatively low level for detecting the data from the reflected laser light by the magnetic Kerr effect. To this end, a laser diode as laser outputting means, an optical system including a polarizing beam splitter and an objective lens, and a detector for detecting the reflected light, are mounted on the optical head 22. The objective lens, mounted to the optical head 22, is held by for example a biaxial mechanism for displacement in the radial direction of the disc and in a direction towards and away from the disc. The optical head 22 is provided with a photodetector PD for supplying a received light signal A and a received light signal B in an enclosed optical disc discriminating device. Since it is necessary to determine the proceeding direction, at the time of discriminating the optical disc, the objective lens or the entire optical head 22 is moved at a constant velocity from an inner rim towards an outer rim of the optical disc. The received light signal A and the received light signal B may be detected at a speed sufficient to overcome the amount of movement caused by the offset.

In the present embodiment, a phase compensation plate is provided on the readout light path of the optical head 22 in order to develop the maximum replay characteristics for the conventional Mini-Disc and the next generation MD1 and MD2 having different physical design parameters on the medium surface. By this phase compensation plate, the bit error rate during readout may be optimized.

A magnetic head 23 is arranged in a location facing the optical head 22 with the disc 90 in-between. The magnetic head 23 applies a magnetic field, modulated by recording data, to the disc 90. Although not shown, a sled motor and a sled mechanism are provided for causing movement of the optical head 22 in its entirety and the magnetic head 23 along the radius of the disc. When the enclosed optical disc discriminating device discriminates the optical disc, the sled motor and the sled mechanism are moved from the inner rim towards the outer rim of the optical head 22.

The optical disc recording and/or reproducing apparatus 11 is provided with a recording processing system, a reproducing processing system and a servo system, in addition to the recording and/or reproducing head system composed of the optical head 22 and the magnetic head 23, and to the disc rotating driving system by the spindle motor 21. As the recording processing system, there are provided a circuit unit responsible for EFM modulation and ACIRC encoding at the time of recording on a conventional Mini-Disc and a circuit unit responsible for RLL (1-7) PP modulation RS-LDC encoding at the time of recording on the next generation MD1 and the next generation MD2.

As the reproducing processing system, there are provided a section responsible for demodulation as a counterpart operation for EFM modulation, and ACIRC decoding at the time of reproducing the conventional Mini-Disc, and a circuit unit responsible for demodulation (PR (1, 2, 1) ML and RLL (1-7) demodulation based on data detection employing viterbi decoding) and for RS-LDC decoding, as a counterpart operation for the RLL (1-7) PP modulation at the time of reproducing the next generation MD1 and the next generation MD2.

The information detected as the reflected light of the illuminated laser light on the disc 90 of the optical head 22 (optical current obtained on detecting the reflected laser light by the photodetector) is routed to an RF amplifier 24. This RF amplifier 24 executes current-voltage conversion, amplification and matrix calculations on the input detected information to extract the replay RF signals, tracking error signals TE, focusing error signals and the groove information (ADIP information recorded on the disc 90 by track wobbling) as the replay information.

In this RF amplifier 24, there are enclosed a tracking error signal calculating unit, making up the optical disc discriminating device of the optical head 22, a pull-in signal calculating unit, and a comparator.

For reproducing the Mini-Disc, the replay RF signals, obtained in the RF amplifier, are processed through the comparator 25 and the PLL circuit 26 by an EFM demodulating unit 27 and an ACIRC decoder 28. The replay RF signals are turned into bi-level signals by the EFM demodulating unit 27 and turned into an EFM signal string, which then is EFM demodulated, corrected for errors and deinterleaved in the ACIRC decoder 28. If the signals are audio data, the data at this time point are ATRAC compressed data.

At this time, the Mini-Disc signal side of the selector 29 is selected and the demodulated ATRAC compressed data are output as replay data from the disc 90 to the data buffer 30. In this case, the compressed data is supplied to the audio processing unit, not shown.

On the other hand, in reproducing the next-generation MD1 or the next-generation MD2, the replay RF signals, obtained by the RF amplifier, are processed by an RLL (1-7) PP demodulating unit 35 and an RS-LDC decoder 36, via an A/D converting circuit 31, an equalizer 32, a PLL circuit 33 and a PRML circuit 34. As for the replay RF signals, replay data, as an RLL (1-7) code string, is obtained by data detection employing PR (1, 2, 1) ML and viterbi decoding, in the RLL (1-7) PP demodulating unit 35. On this RLL (1-7) code string, RLL (1-7) demodulation processing is carried out. The resulting data is corrected for errors and deinterleaved in the RS-LDC decoder 36.

In this case, the next generation MD1—next generation MD2 side of the selector 29 is selected, such that the demodulated data is output as replay data from the disc 90 to the data buffer 30. The demodulated data is then supplied to a memory transfer controller, not shown.

The tracking error signals TE and the focusing error signals FE, output from the RF amplifier 24, are supplied to a servo circuit 37, while the groove information is supplied to an ADIP decoder 38.

The ADIP decoder 38 limits the bandwidth of the groove information by a band-pass filter to extract wobble components and subsequently effectuates FM modulation and bi-phase demodulation to extract the ADIP address. If the disc is the conventional Mini-Disc or the next generation MD1, the ADIP information as the absolute information on the disc is supplied to a system controller 41 through a MD address decoder 39, whereas, if the disc is the next generation MD2, the ADIP information is supplied to the system controller 41 through a next generation MD2 address decoder 40.

The system controller 41 executes preset control processing based on each ADIP address. The groove information is returned to the servo circuit 37 for spindle servo control.

The system controller 41 is provided with the function of a D-flip-flop discriminating circuit making up the optical disc discriminating device. The system controller 41 discriminates the sort of the MD based on the result of discrimination by the D-flipflop discriminating circuit.

Based on error signals, obtained on integrating the phase error between the groove information and the replay clocks (PLL-based clocks at the time of decoding), the servo circuit 37 generates spindle error signals for CLV servo control and for ZCAV servo control.

Based on the spindle error signals, tracking and focusing error signals, supplied form the RF amplifier 24, or track jump command or accessing command, from the system controller 41, the servo circuit 37 generates various servo control signals, such as tracking control signals, focusing control signals, sled control signals or spindle control signals, and outputs these servo control signals to a motor driver 42. That is, the servo circuit 37 performs phase compensation processing, gain processing or target value setting processing, as needed, on servo error signals or commands, to generate various servo control signals.

Based on the servo control signal, supplied from the servo circuit 37, the motor driver 42 generates preset servo driving signals. These servo control signals prove a sled motor driving signals (two driving signals, namely the signals for the focusing direction and those for the tracking direction) actuating the biaxial mechanism, a sled motor driving signal, driving the sled mechanism, and a spindle motor driving signal, driving the spindle motor 21. By these servo driving signals, the focusing control and tracking control for the disc 90 and the CAV or ZCAV control for the spindle motor 21 is exercised.

In discriminating the optical disc, the optical disc discriminating device controls the servo circuit 37 and the motor driver 42, by the system controller 41, to turn on the focusing of the laser light by the objective lens of the optical head 22. The tracking servo is not applied. The sled servo is such as to cause the optical head 22 to be moved from the inner rim towards the outer rim at a certain velocity.

In recording on the disc 90, high density data is supplied from a memory transfer controller, not shown, or usual ATRAC compressed data is supplied from an audio processing unit.

In recording on the conventional Mini-Disc, the selector 43 is connected to a conventional Mini-Disc side, such that an ACIRC encoder 44 and an EFM modulating unit 45 are in operation. When the input is an audio signal, compressed data from an audio processing unit 19 is interleaved and added by an error correction code by the ACIRC encoder 44 so as to be then EFM modulated by the EFM modulating unit 45. The EFM modulated data are supplied via selector 43 to a magnetic head driver 46 which then causes the magnetic head 23 to apply a magnetic field corresponding to the EFM modulated data to the disc 90 to record modulated data.

In recording on the next generation MD1 and on the next generation MD2, the selector 43 is connected to the next generation MD1—next generation MD2side, such that an RS-LDC encoder 47 and the RLL (1-7) PP modulating unit 48 are in operation. It is noted that high density data sent from a memory transfer controller 12 is interleaved and added by an error correction code of the RS-LDC system, in the RS-LDC encoder 47, and RLL (1-7) modulated by the RLL (1-7) PP modulating unit 48.

The data for recording, modulated into an RLL (1-7) codestring, is supplied via selector 43 to the magnetic head driver 46, which then causes the magnetic head 23 to apply a magnetic field corresponding to the modulated data to the disc 90 to record the data.

A laser driver/APC 49, which causes a laser diode to emit laser light in replay and in recording, described above, also effectuates so-called APC (automatic laser power control). Specifically, a detector for monitoring the laser power, not shown, is provided within the optical head 22, with a monitor signal thereof being fed back to the laser driver/APC 49. This laser driver/APC 49 compares the current laser power, obtained as a monitor signal, to a preset laser power, to find an error, and causes the error to be reflected in the laser driving signal, in order to manage control so that the laser power output from the laser diode will be stabilized at a setting value. It should be noted that the magnitudes of the laser power, in terms of the replay laser power and the recording laser power, are set in an internal register of the laser driver/APC 49 by the system controller 41.

The system controller 41 controls various component parts, based on commands from a system controller 18, such as to execute the above-mentioned various operations, including the accessing, various servo operations, data write or data readout operations. Meanwhile, various components parts surrounded by chain-dotted lines, shown in FIG. 19, may each be constructed by a one-chip circuit.

Thus, the optical disc recording and/or reproducing apparatus 11, capable of rotationally driving the next generation MD2 in accordance with the ZCAV system, is capable of realizing the aforementioned ZCAV system, by simply following up with the carrier PDIP frequency, without specifically modifying the CLV system employed in the first generation MD or the next generation MD1. That is, in a given zone, the spindle motor is being run in rotation at a constant velocity. A rotationally driving controller does not see this in such a manner that it is rotationally driving the disc at CAV in a given zone, but rather sees this as if the rotationally driving controller is rotationally driving the disc in an attempt to make the carrier frequency of the ADIP constant.

When the optical head is moved astride the neighboring zones, the number of revolutions of the spindle motor can be varied smoothly because the zone-to-zone speed offset is of a small value not larger than 3%.

As for zone allocation, a uniform recording unit allocation system may be used in lieu of the constant in-zone density ratio system described above. This uniform recording unit allocation system is the system of determining the number of zones by the number of the recording units as the recording and/or reproducing units. For example, with the number of zones of 23, the number of tracks/zones is 284 to 527, with the number of clusters (number of the recording units)/zones being 504. The line density is 0.16 to 0.1691 μm/bit. As a result, the recording capacity is 1.025 G (109). Meanwhile, the number of clusters (number of the recording units)/zones is the number excluding 4-cluster interruptions and 4-cluster interchanges, while the recording capacity is the number excluding the interchanged recording units. As for the line density, the density ratio is 1.52 to 5.15%. The recording capacity is a value excluding the number of interchanged units. The system is convenient to use because the capacity per zone is determined while it may be seen how many recording units must be passed through before the optical head reaches the neighboring zone.

The uniform track allocation system, which determines the number of zones from the number of tracks, may also be used. For example, with the number of zones equal to 23, the number of tracks/number of zones is 504, with the value of the number of clusters (number of recording units)/number of zones being 352 to 658. The line density is 0.16 to 0.1663 μm/bit. Consequently, the recording capacity is 1.023 G (109). Meanwhile, the number of clusters/number of zones is a number excluding the number of 4-cluster interruptions and the number of 4-cluster interchanges. The density ratio, in terms of the line density ratio, is 2.05 to 3.94%. The value of the recording capacity is a value excluding the interchange recording units. In this example, accessing may be facilitated because the distance up to a given zone can be calculated in terms of the number of tracks lying ahead until the zone is reached.

By way of comparison, a case of the number of zones of 23 in the constant in-zone density ratio system is now shown by way of comparison. With the number of zones of 23, the number of tracks/number of zones is 364~660, with the value of the number of clusters (number of recording units)/number of zones being 338~1158. The line density is 0.16 to 0.1646 μm/bit. Consequently, the recording capacity is 1.023 G (109). The zone-to-zone speed offset (density ratio) is 2.72%. Meanwhile, the number of clusters/number of zones is a number excluding the number of 4-cluster interruptions and the number of 4-cluster interchanges. The recording capacity is a value excluding the number of the interchanged recording units. This system is suited to such a case where priority is given to RF characteristics because it is sufficient to provide for a constant inner radius to outer radius ratio from one zone to the next.

The logical format and the physical format of the next generation MD2 are now explained.

Similarly to the next generation MD1, the next generation MD2 uses, as the modulation system for recording data, the RLL (1-7) PP modulation system, suited to high density recording. Meanwhile, RLL denotes Run Length Limited, while PP denotes Parity preserve/Prohibit rmtr (repeated minimum transition runlength). As the error correction system, an RS-LDC (Reed Solomon-Long Distance Code) with BIS (Burst Indicator Subcode) with a higher correction capability is used.

Figure 20:
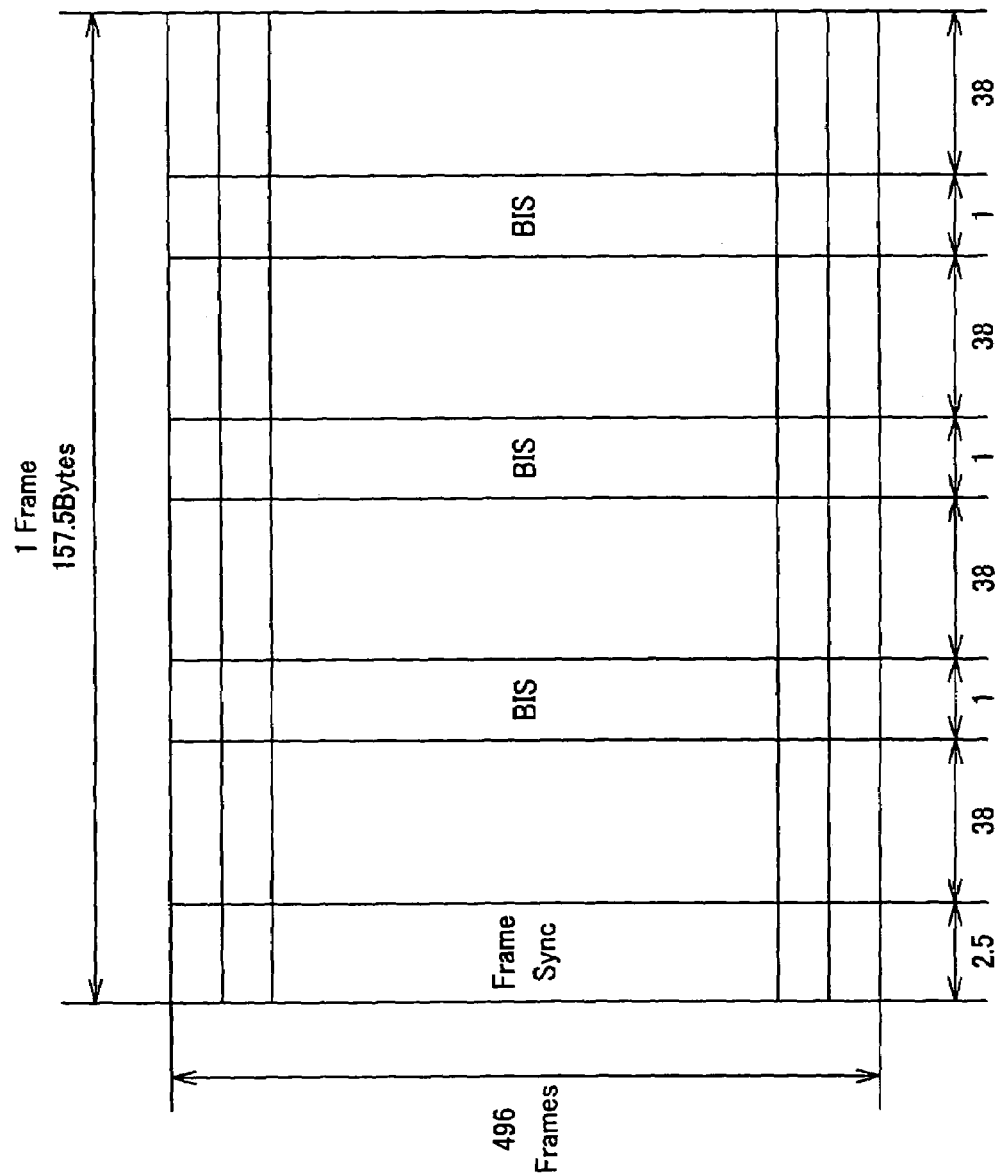
FIG. 20 shows the data block structure including BIS of the next generation MD1 and the next generation MD2.
Figure 21:
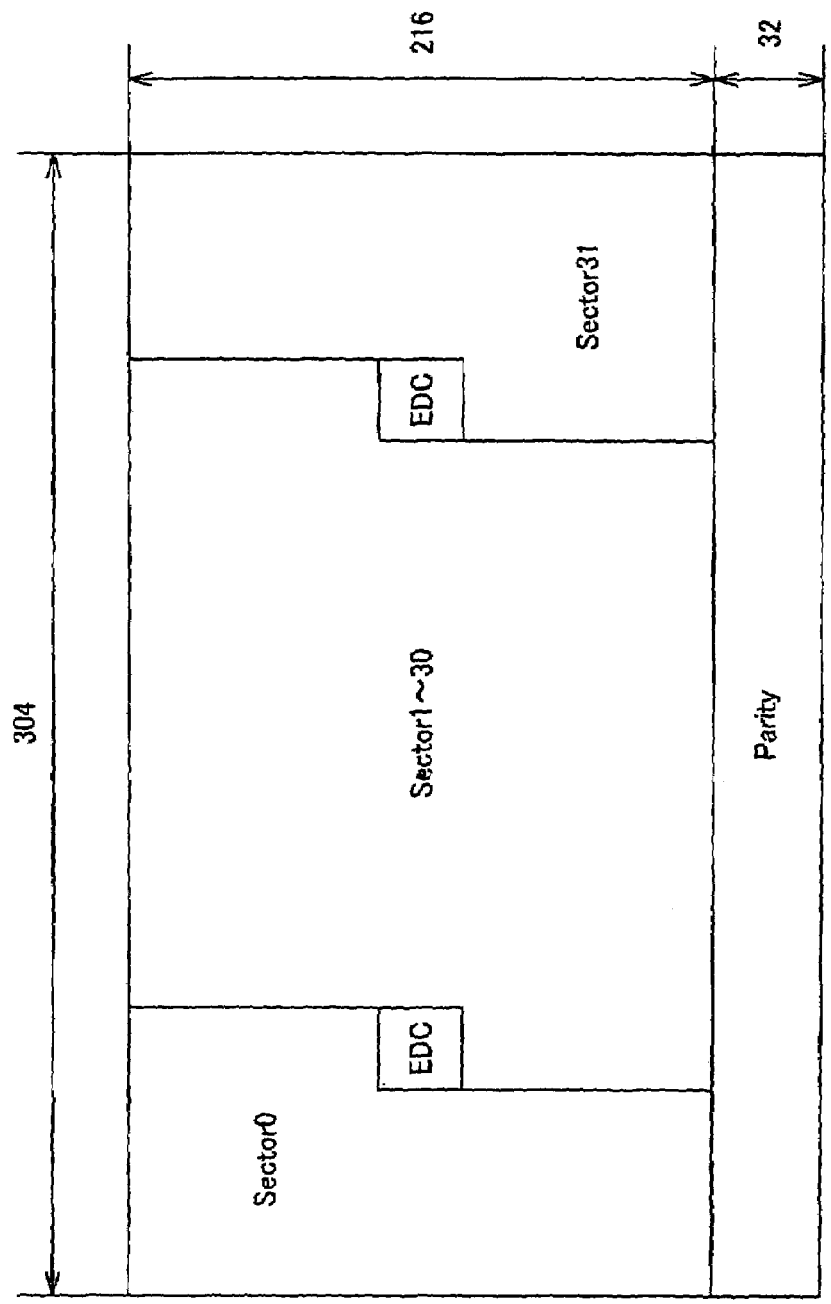
FIG. 21 shows the ECC format for a data block of the next generation MD1 and the next generation MD2.

Specifically, 2048 bytes of user data, supplied from e.g. a host application, and 4 bytes of EDC (Error Detection Code) appended thereto, totaling at 2052 bytes, make up one sector (data sector distinct from the physical sector on the disc as later explained). 32 of these sectors, namely the sector 0 to sector 31, make up one block of 304 columns by 216 rows, as shown in FIG. 20. The 2052 bytes of the respective sectors are scrambled such as to take exclusive OR (Ex-OR) with preset pseudo random numbers. 32 bytes of parity are appended to each column of each scrambled block to form an LDC (Long Distance Code) of 304 columns by 248 rows. This LDC block is interleaved to give a block of 152 columns by 496 rows (Interleaved LDC Block). Four sets each of 38 columns are arrayed, with one column of the above-mentioned BIS in-between, to give an array of 155 columns by 496 rows, and 2.5 bytes of the frame synchronization code (Frame Sync) are appended to a leading position of each column so that one column is associated with one frame in order to give an array of 157.5 bytes by 496 frames, as shown in FIG. 20. The respective rows of FIG. 20 are associated with 496 frames of from Frame 10 to Frame 505 of the data area in one recording block (cluster) shown in FIG. 23 as explained later.

In the above-described data structure, data interleaving is of the block completion type. This gives data redundancy of 20.50%. The data detection system is the viterbi decoding system by PR (1, 2, 1) ML.

As the disc driving system, the CLV system is used, with the line speed being 2.4 m/sec. The standard data rate at the time of recording and/or reproduction is 4.4 MB/sec. With this system, the total recording capacity can be 300 MB. With the use of the RLL (1-7) PP modulation system, in lieu of EFM, as the modulation system, the window margin may be 0.666 from 0.5, thus achieving a high density by a factor of 1.33. The cluster, as the minimum rewrite unit of data, is made up by 16 sectors (64 kB).

Thus, by employing the RS-LDC system with BIS, employing a different sector structure and viterbi decoding, as the recording modulating system, in lieu of the CIRC system, the data efficiency can be raised to 79.5%, from 53.7%, thus achieving a high density by a factor of 1.48.

By virtue of the above features, taken together, the recording capacity of the next generation MD1 can be 300 MB which is about twice that of the conventional Mini-Disc.

On the other hand, the next generation MD2 is a recording medium exploiting a high density recording technique, such as DWDD (Domain Wall Displacement Detection), and has a physical format different from that of the above-described conventional Mini-Disc or that of the next generation MD1. This next generation MD2 has a track pitch of 1.25 μm and a bit length of 0.16 μm/bit and is densified along the line direction.

Moreover, for compatibility with the conventional Mini-Disc and the next generation MD1, the optical system, readout system and the servo processing are the same as those of the prevailing standard. Specifically, the laser wavelength λ is such that λ=780 nm, the numerical aperture of the optical head is such that NA=0.45. The recording system is the groove recording system, while the addressing system is that exploiting the ADIP. The outer shape of the casing is of the same standard as that of the conventional Mini-Disc and the next generation MD1.

Figure 22:
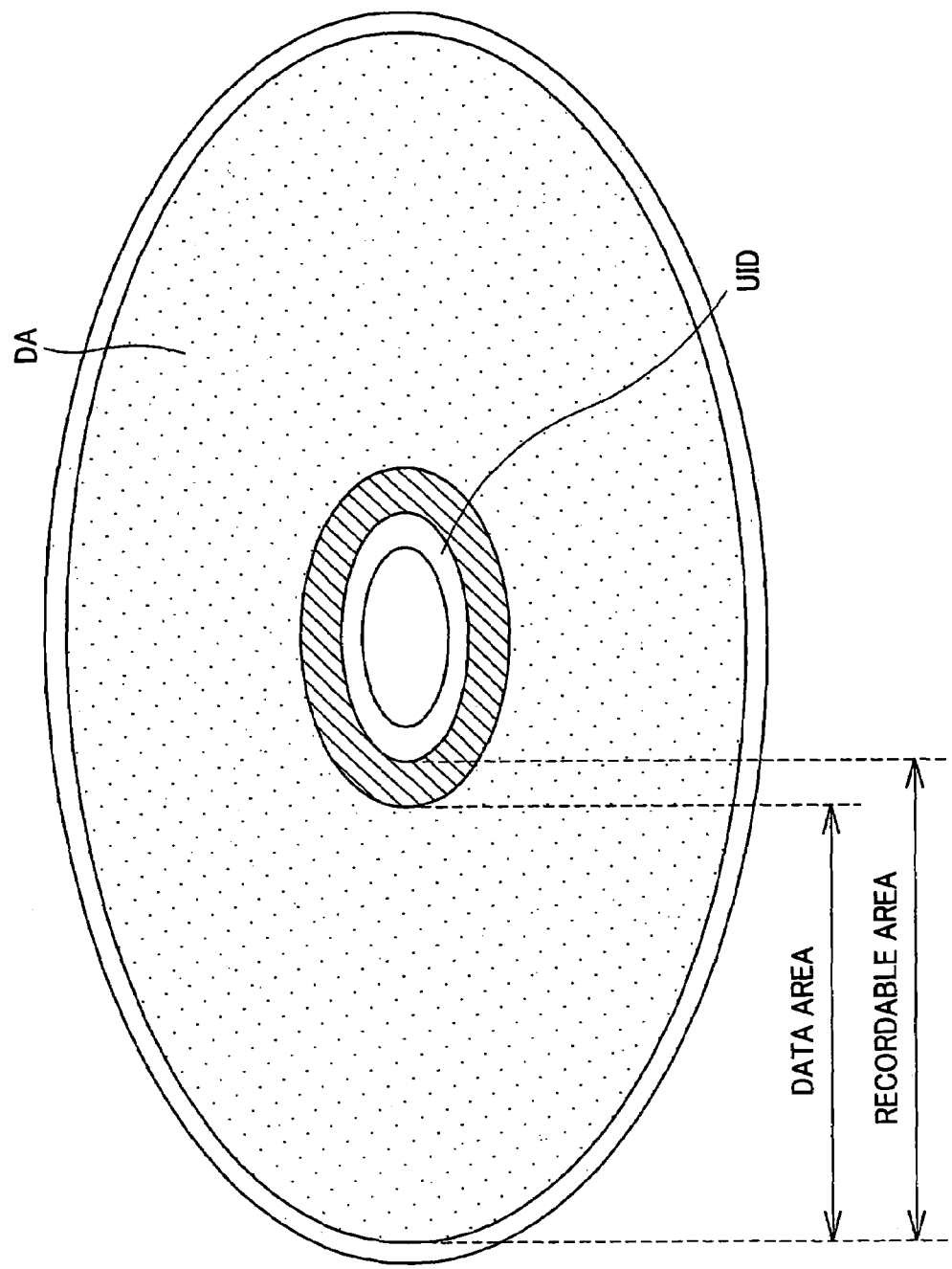
FIG. 22 schematically shows an illustrative area structure on a disc surface of the next generation MD2.

With the next generation MD2, no pre-bits are used, for achieving a high density, as shown in FIG. 22. Thus, in the next generation MD2, there is no PTOC area by pre-bits. In the next generation MD2, there is provided, inwardly of a recordable area, a UID area for recording the information for copyright protection, the information for checking data tampering or the unique ID (UID) as a basis for other information that is not laid open. In this UID area, recordings are made in accordance with a recording system different from the DWDD system applied to the next generation MD2.

The relationship between the ADIP sector structure and the data block of the next generation MD1 and the next generation MD2 is now explained with reference to FIG. 23. In the conventional Mini-Disc (MD) system, a cluster/sector structure associated with the physical address recorded as the ADIP is used. In the present specified embodiment, a cluster derived from the ADIP address is termed an [ADIP cluster] for explanation sake, while the cluster derived from the address in the next generation MD1 and the next generation MD2 is termed a [recording block] or a [next generation MD cluster].

Figure 23:
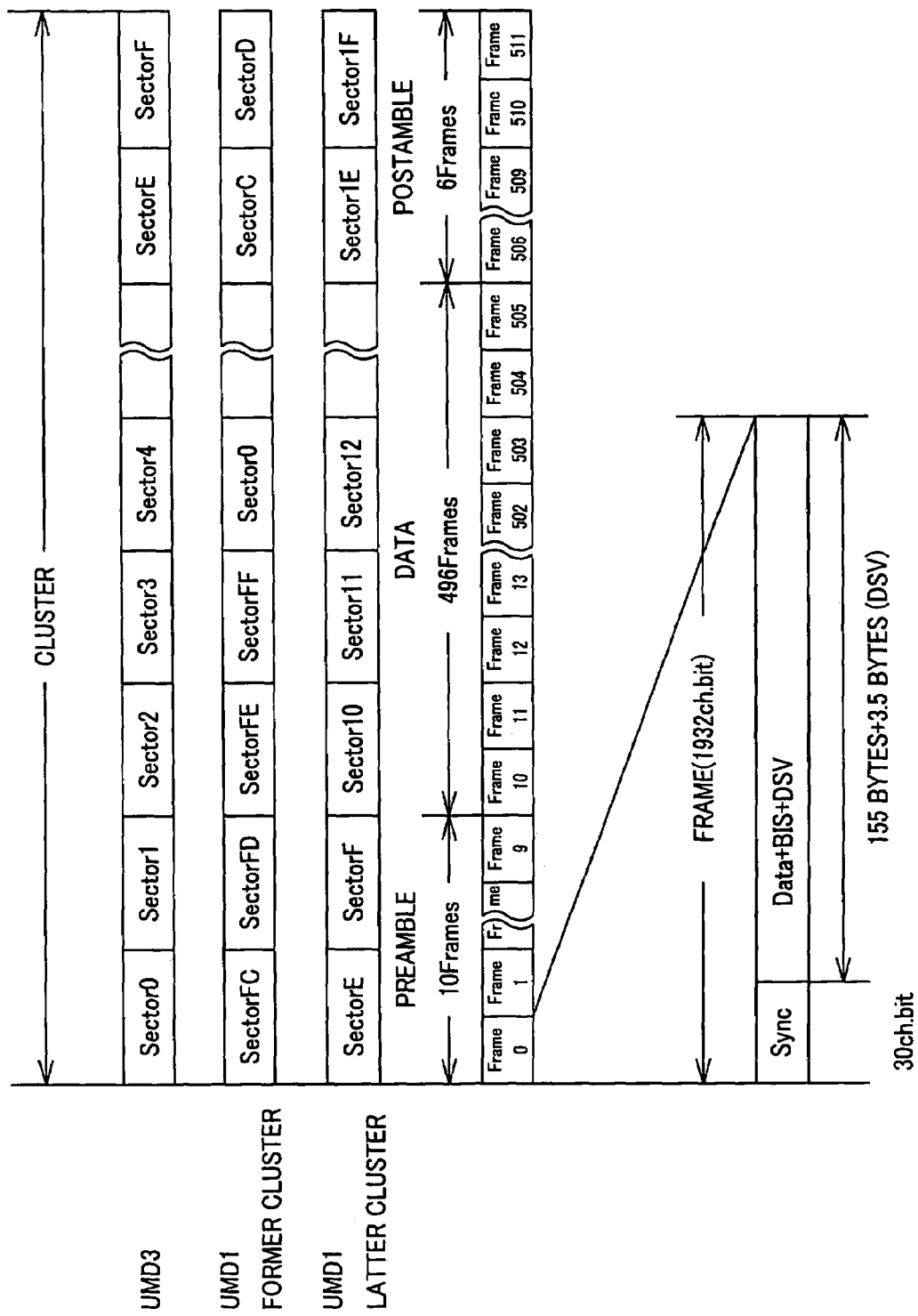
FIG. 23 illustrates the relationship between the ADIP sector structure and the data block of the next generation MD1 and the next generation MD2.

In the next generation MD1 and the next generation MD2, a data track is handled as a data stream recorded by a succession of clusters, as minimum address units, as shown in FIG. 23, such that one recording block (first generation MD cluster) is formed by 16 sectors or one-half ADIP cluster, as shown in FIG. 23.

The data structure of one recording block (first generation MD cluster) shown in FIG. 23 is made up by 512 frames, namely 10 frames of a preamble, 6 frames of a post-amble, and 496 frames of a data section. Each frame in this recording block is made up by a synchronization signal area, data, BIS and DSV.

Each set of 31 frames, obtained on dividing 496 frames, in which there are recorded significant data, of the 512 frames, making up one recording block, into 16 equal portions, is termed an address unit. The number of this address unit is termed an address unit number (AUN). This AUN, which is a number accorded to the totality of the address units, is used for address management of recording signals.

In recording high density data, modulated in accordance with the (1-7) PP modulation system, on a conventional Mini-Disc having a physical cluster/sector structure, described in the ADIP such as the next generation MD1, a problem may be presented in which the ADIP address, inherently recorded on the disc, and an address of an actually recorded data block, are not coincident with each other. In random accessing, which is carried out with the ADIP address as a reference, recorded data can be read out even when access is made to a vicinity of a location where there is written desired data. However, in writing data, it is necessary to access to a correct location in order not to overwrite and erase already recorded data. It is therefor crucial to correctly grasp the access position from the next generation MD cluster/next generation MD sector associated with the ADIP address.

Thus, with the next generation MD1, a high density data cluster is grasped by a data unit obtained on conversion of an ADIP address, recorded as a wobble on the medium surface, in accordance with a preset rule. In this case, an integer number multiples of the ADIP sector is to be a high density data cluster. If, based on this concept, the next generation MD cluster is stated in one ADIP cluster, recorded on a conventional Mini-Disc, each next generation MD cluster is formed in one-half ADIP cluster domain.

Thus, in the next generation MD1, two of the above-mentioned next generation MD2 clusters are associated with one ADIP cluster as being a minimum recording unit (recording block).

In the next generation MD2, one cluster is handled as one recording block.

In the present specified embodiment, a 2048 byte based data block, supplied from a host application, is one logical data sector (LDS), and a set of 32 logical data sectors, recorded in the same recording block, is a logical data cluster (LDC).

With the above-described data structure, the UMD data can be recorded at an optimum timing on a recording medium, when the UMD data is to be recorded at an optional location on the recording medium. Since an integer number of next generation MD clusters is contained in the ADIP cluster as ADIP address unit, the rule of address conversion from the ADIP cluster address to the UMD data cluster address is simplified to simplify the circuitry for conversion or the software configuration.

Although FIG. 23 shows an embodiment in which two next generation MD clusters are associated with one ADIP cluster, three or more next generation MD clusters may also be arranged on one ADIP cluster. It should be noted that the present invention is not limited to a structure in which one next generation MD cluster is made up by 16 ADIP sectors, such that the number of the ADIP sectors that go to make up the next generation MD cluster may be set depending on the difference in the data recording density of the EFM modulation system and that of the RLL (1-7) PP modulation system, the number of sectors that go to make up the next generation MD cluster or the size of one sector.

The data structure of the ADIP is hereinafter explained. FIG. 24A shows the data structure of the ADIP of the next generation MD2, whilst FIG. 24B shows the data structure of ADIP of the next generation MD1 for comparison sake.

In the next generation MD1, there are stated a synchronization signal, the information on the cluster H information and the cluster L information, indicating e.g. cluster numbers in a disc, and the sector information (sector) including the sector number in the cluster. The synchronization signal is stated with four bits, the cluster H is stated with the upper eight bits of the address information, the cluster L is stated with lower eight bits of the address information, and the sector information is stated with four bits. The CRC is appended as trailing end 14 bits. Thus, a sum total of 42 bits are recorded in a header of each ADIP sector.

In the next generation MD2, there are recorded four bits of synchronization signal data, four bits of the cluster H information, eight bits of the cluster M information, four bits of the cluster L information and four bits of the sector L information. BCH parity is appended as 18 trailing end bits. In the next generation MD2, 42 bits of the ADIP signals are recorded in a header of each ADIP sector.

In the ADIP data structure, the structures of the cluster H information, cluster M information and the cluster L information may be determined arbitrarily. Other supplementary information can also be stated in this structure. For example, in the ADIP signal of the next generation MD2, shown in FIG. 25, it is possible to state the cluster information as the cluster H of the upper eight bits and the cluster L of the lower eight bits, and to state the disc control information in lieu of the cluster L represented by the lower eight bits. The disc control information may be enumerated by e.g. a servo signal correction value, an upper limit value of the replay laser power, correction coefficients for the line speed of the replay laser power, an upper limit value of the recording laser power, correction coefficients for the line speed of the recording laser power, recording magnetic sensitivity, magnetic-laser pulse phase difference and the parity.

The replay processing and the recording processing by the disc driving device for the next generation MD1 and the next generation MD2, as discriminated by the optical disc discriminating device, are hereinafter explained in detail.

Figure 26:
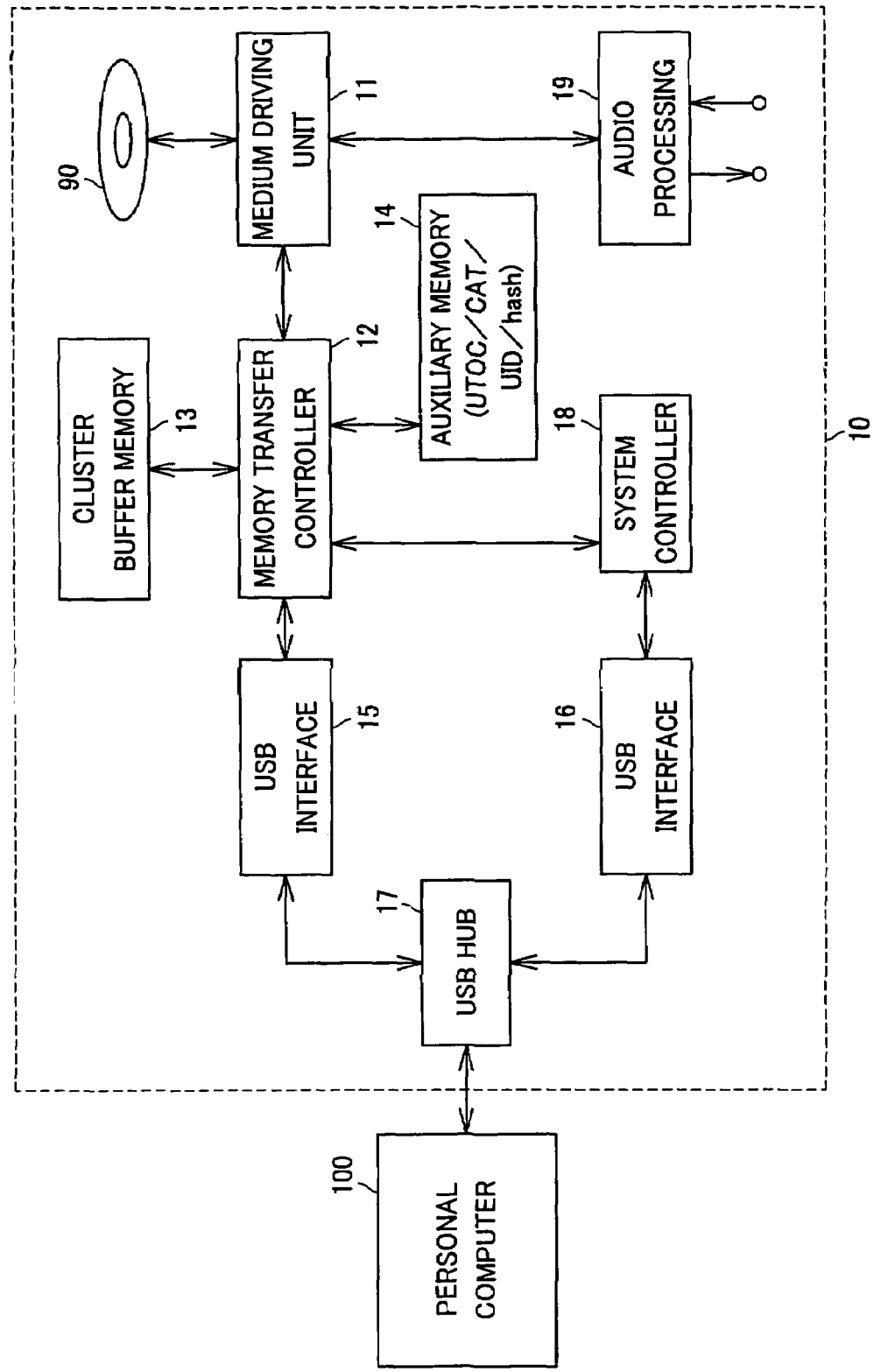
FIG. 26 is a block diagram showing the structure of a disc drive device.

FIG. 26 shows the structure of a disc driving device 10 having the optical disc recording and/or reproducing apparatus 11 as a medium driving unit 11. The disc driving device 10 can be connected to a personal computer (PC) 100, and is capable of using the next generation MD1 and the next generation MD2 not only as audio data but also as external storage such as PC.

Referring to FIG. 26, the disc driving device 10 includes the medium driving unit 11, having enclosed therein the optical disc discriminating device, a memory transfer controller 12, a cluster buffer memory 13, an auxiliary memory 14, a USB interfaces 15, 16, a USB HUB 17, a system controller 18 and an audio processing unit 19.

The medium driving unit 11 records and/or reproduces for one 90 of a variety of discs, such as the conventional Mini-Disc, next generation MD1 or the next generation MD2. The inner structure of the medium driving unit 11 (optical disc recording and/or reproducing apparatus) has already been explained with reference to FIG. 19.

The memory transfer controller 12 controls transmission and reception of replay data from the medium driving unit 11 and recording data supplied to the medium driving unit 11. The cluster buffer memory 13 buffers the data read out on the high density data cluster basis from the data track of the disc 90 by the medium driving unit 11, under control by the memory transfer controller 12. The auxiliary memory 14 memorizes a variety of the management information and the special information, such as UTOC data, CAT data, unique ID or hash values, under control by the memory transfer controller 12.

The system controller 18 is capable of communication with the PC 100, connected thereto over the USB interface 16 and the USB HUB 17, and performs communication control with this PC 100 to receive commands, such as write or readout requests, transmit the needed information, such as status information, and other information, or to manage integrated control of the disc driving device 10 in its entirety.

If the disc 90, for example, is loaded in the medium driving unit 11, the system controller 18 commands the medium driving unit 11 to read out the management information from the disc 90, in order to cause the management information read out from the memory transfer controller 12 to be stored in the auxiliary memory 14.

The system controller 18 is able to grasp the track recording state of the disc 90 by reading-in these management information. Moreover, by reading-in the CAT, the system controller 18 is able to grasp the high density data cluster structure in the data track, such that the system controller 18 is able to cope with the access request for the data track from the PC 100.

Based on the unique ID value or the hash value, the system controller is able to execute the disc authentication or other processing operations or to transmit these values to the PC to cause the PC 100 to execute disc authentication processing and other processing operations.

When a readout request for a FAT sector is made from the PC 100, the system controller 18 gives a signal to the medium driving unit 11 to the effect that readout of the high density data cluster including this FAT sector is to be executed. The high density data thus read out is written by the memory transfer controller 12 in the cluster buffer memory 13. However, if data of the FAT sector has already been stored in the cluster buffer memory 13, readout by the medium driving unit 11 is not needed.

From data of the high density data cluster, written in the cluster buffer memory 13, the system controller 18 gives a signal for reading out the data of the FAT sector, as requested, to manage control to transmit the data of the FAT sector to the PC 100 via USB interface 15 and the USB HUB 17.

When a write request for a FAT sector is made from the PC 100, the system controller 18 causes the medium driving unit 11 to read out the high density data cluster containing this FAT sector. The high density data cluster, thus read out, is written by the memory transfer controller 12 in the cluster buffer memory 13. However, if the data of the FAT sector has already been stored in the cluster buffer memory 13, no readout by the medium driving unit 11 is needed.

The system controller 18 also causes the data of the FAT sector, transmitted from the PC 100 (recording data), to be supplied through the USB interface 15 to the memory transfer controller 12 to execute rewriting of the corresponding FAT sector data on the cluster buffer memory 13.

The system controller 18 commands the memory transfer controller 12 to transfer the data of the high density data cluster, stored in the cluster buffer memory 13 with the needed FAT sector in a rewritten state, to the medium driving unit 11 as recording data. The medium driving unit 11 writes the recording data of the high density data cluster on the medium, loaded in position, as it modulates the recording data in accordance with the EFM modulation system if the medium is the conventional Mini-Disc or in accordance with the RLL (1-7) PP modulation system if the medium is the next generation MD1 or the next generation MD2.

Meanwhile, in the disc driving device 10, the aforementioned recording and/or reproduction control is the control in recording and/or reproducing a data track. The data transfer in recording and/or reproducing the MD audio data (audio track) is via audio processing unit 19.

As an inputting system, the audio processing unit 19 includes an analog speech signal inputting unit, such as a line input circuit/microphone input circuit, an A/D converter and a digital audio data input unit. The audio processing unit 19 includes an ATRAC compression encoder/decoder and a buffer memory for compressed data. The audio processing unit 19 also includes, as an output system, an analog speech signal output unit, such as a digital audio data output unit, a D/A converter or a line output circuit/headphone unit.

It is when the digital audio data (or the analog speech signal) is supplied to the audio processing unit 19 that an audio track is recorded on the disc 90. The input linear PCM digital audio data, or the linear PCM digital audio data supplied in the form of an analog speech signal and subsequently converted by the A/D converter, is ATRAC compression encoded and stored in the buffer memory. The audio data then is read out from the buffer memory at a predetermined timing (data unit corresponding to the ADIP cluster) so as to be transferred to the medium driving unit 11.

The medium driving unit 11 modulates the transferred compressed data in accordance with the first modulation system, EFM modulation system or the RLL (1-7) PP modulation system, to write the modulated data as audio track on the disc 90.

In reproducing the audio track from the disc 90, the medium driving unit 11 demodulates the replay data to the state of the ATRAC compressed data to transfer the demodulated data to the audio processing unit 19. This audio processing unit 19 performs ATRAC compression decoding on the data to turn the data into linear PCM audio data which is then output at a digital audio data output unit. Or the audio processing unit converts the data into analog speech signals which are then output to a line output/headphone output.

It should be noted that the structure shown in FIG. 26 is merely illustrative. For example, if the disc driving device 10 is connected to the PC 100 so as to be used as an external storage device adapted for recording and/or reproducing only data tracks, the audio processing unit 19 is not needed. On the other hand, if recording and/or reproduction of audio signals is the principal target, it is preferable that there is provided the audio processing unit 19 and further there are provided an operating unit and a display unit as a user interface. For connection to the PC 100, not only the USB but also the so-called IEEE1394 interface pursuant to the provision as provided for by the IEEE (The Institute of Electrical and Electronics Engineers, Inc.) or the general-purpose connection interface may be used.

In accessing to a data area, a command for recording and/or reproducing data in terms of a [logical sector] (referred to below as FAT sector) as a unit is issued from the external PC 100 through the USB interface 16 to the system controller 18 of the disc driving device 10. To the PC 100, it appears as if the data cluster is divided in terms of 2048 bytes as a unit and is supervised in accordance with the FAT file system in the increasing order of the USN. On the other hand, the minimum rewrite unit of the data track in the disc 90 is the next generation MD cluster, having the size of 65,536 bytes, and the LCN is given to this next generation MD cluster.

The size of the data sector, referenced by the FAT, is smaller than that of the next generation MD cluster. It is therefore necessary for the disc driving device 10 to convert the user sector, referenced by the FAT, into a physical ADIP address, and to convert read/write, in terms of the data sector, referenced by the FAT, into read/write in terms of the next generation MD cluster based read and write, using the buffer memory 13.

Figure 27:
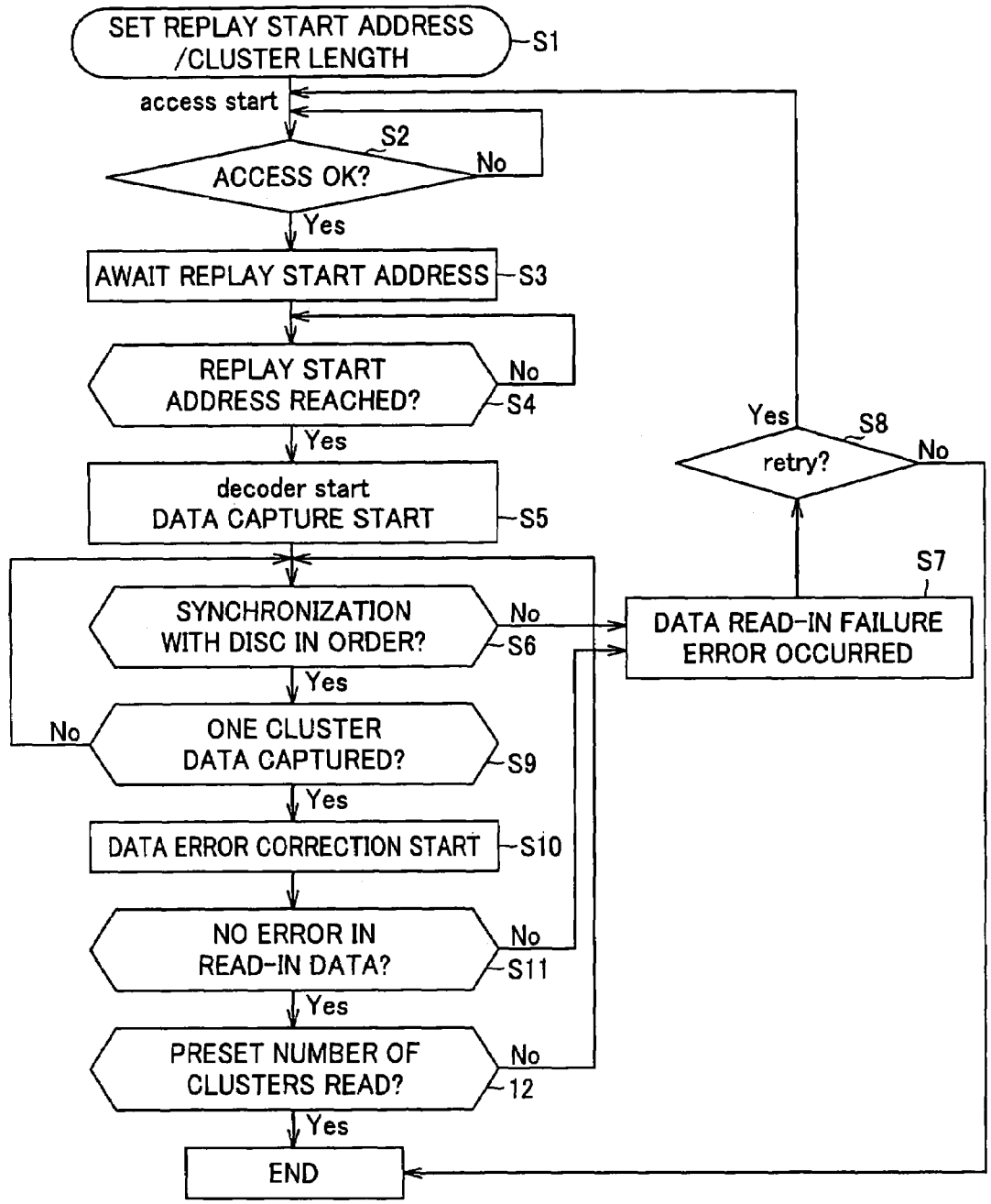
FIG. 27 is a flowchart showing the processing in a system controller in a disc drive device in case a request for reading out a given FAT sector is made from a PC.

FIG. 27 shows the processing in the system controller 18 in the disc driving device 10 in case a request for readout of a certain FAT sector from the PC 100.

On receipt of a readout command for reading out the FAT sector #n from the PC 100 via USB interface 16, the system controller 18 performs the processing of finding the next generation MD cluster number containing the FAT sector of the specified FAT sector number #n.

The provisional next generation MD cluster number id determined. Since the size of the next generation MD cluster is 65536 bytes and the size of the FAT sector is 2048 bytes, there are 32 FAT sectors in the first generation MD cluster. Thus, the FAT sector number (n) divided by an integer 32, with the remainder being truncated (u0), represents the provisional next generation MD cluster number.

The system controller then references the disc information, read-in from the disc 90 into the auxiliary memory 14, to find the number of the next generation MD cluster ux other than the clusters for data recording. This number is the number of the next generation MD clusters of a secure area.

Among the next generation MD clusters within the data track, there is a cluster that is not laid open as being a data recordable/reproducible area. Thus, the number of clusters not laid open ux is found based on the disc information previously read into the auxiliary memory. The number of clusters not laid open ux is then summed to the cluster number u0 of the next generation MD cluster number to give a sum u which is to be the actual next generation MD cluster number #u.

When the next generation MD cluster number #u, including the FAT sector number #n, is found, the system controller 18 determines whether or not the next generation MD cluster of the cluster number #u has already been read out and stored in the cluster buffer memory 13. If the cluster has not been stored, it is read out from the disc 90.

The system controller 18 finds the ADIP address #a from the next generation MD cluster number #u as read out to read out the next generation MD cluster from the disc 90.

The next generation MD cluster may be recorded in plural parts on the disc 90. For this reason, these parts need be retrieved sequentially in order to find the actually recorded ADIP address. The number of the MD clusters of the next generation and the number of the leading next generation MD cluster px, recorded in the leading part of the data track, are found from the disc information read out in the auxiliary memory 14.

Since the start address/end address are recorded in the respective parts by the ADIP address, the number of the next generation MD clusters p and the leading next generation MD cluster px may be found from the disc information read out into the ADIP cluster address and the part length. It is then verified whether or not the next generation MD cluster of the targeted cluster number #u is included in this part. If the cluster is not included in the part, the next part is checked. This next part is that part which is specified by the link information of the part which has thus far been of interest. In this manner, the parts stated in the disc information are sequentially retrieved to determine the part containing the next generation MD cluster of interest.

When the part having recorded the next generation MD cluster of interest (#u) is found, the difference between the cluster number px of the next generation MD cluster recorded in the leading end of this part thus found and the cluster number #u of the next generation MD cluster of interest is found to find the offset from the leading end of the part to the next generation MD cluster (#u) of interest.

Since two next generation MD clusters are written in this case in one ADIP cluster, the offset may be converted into the ADIP address offset f by dividing the offset by 2 (f=(u−px)/2).

However, if a fractional number of 0.5 is obtained, writing is from the mid part of the cluster f. Ultimately, an offset f is added to a cluster address part in the start address of the part to find the ADIP address #a of the destination of recording in which to actually write the next generation MD cluster #u. The above corresponds to the processing of setting the replay start address and the cluster length in the step S1. It is here assumed that decision as to whether the medium is the conventional Mini-Disc, the next generation MD1 or the next generation MD2 has already been finished by another particular technique.

When the ADIP address #a has been found, the system controller 18 commands the medium driving unit 11 to access to the ADIP address #a. The medium driving unit 1 then accesses the ADIP address #a, under control by the system controller 41.

In a step S2, the system controller 18 awaits the access completion. On access completion, the system controller 18 awaits the optical head 22 reaching the targeted replay start address. If, in a step S4, the system controller has ascertained that the replay start address has been reached, the system controller commands the medium driving unit 11 to start reading out one cluster of data of the next generation MD cluster.

Responsive thereto, the medium driving unit 11 commences to read out data from the disc 90, under control by the system controller 41. The read-out data are output by a replay system of the optical head 22, RF amplifier 24, RLL (1-7) PP demodulating unit 35 and the RS-LDC decoder 36 and thence routed to the memory transfer controller 12.

In a step S6, the system controller 18 verifies whether or not synchronization with respect to the disc 90 has been in good order. If the synchronization with respect to the disc 90 is not in good order, a signal indicating the purport of occurrence of a data readout error is generated in a step S7. If, in a step S8, it is determined that readout is to be performed again, the step as from step S2 is repeated.

When one cluster data has been acquired, the system controller 18 in a step S10 commences correcting the acquired data for errors. If, in a step S11, there is an error in the acquired data, the system controller 18 reverts to a step S7 to generate a signal indicating that a data readout error has occurred. If there is no error in the acquired data, it is verified in a step S12 whether or not a preset cluster has been acquired. When the preset cluster has been acquired, the sequence of processing operations is terminated. The system controller 18 awaits the readout operation by the medium driving unit 11 to store data read out and supplied to the memory transfer controller 12 in the cluster buffer memory 13. When the preset cluster has not been acquired, the process as from the step S6 is repeated.

One cluster data of the next generation MD cluster, read into the cluster buffer memory 13, includes plural FAT sectors. Thus, from these FAT sectors, the storage location of data of the requested FAT sector is found and data of one FAT sector (2048 bytes) are sent out from the USB interface 15 to the external PC 100. Specifically, the system controller 18 finds, from the requested FAT sector number #n, a byte offset #b within the next generation MD cluster containing this sector. The system controller causes data for one FAT sector (2048 bytes), from the location of the byte offset #b in the cluster buffer memory 13, to transfer the so read-out data via USB interface 15 to the PC 100.

By the above processing, the next generation MD sector may be read out and transferred responsive to a readout request for one FAT sector from the PC 100.

Figure 28:
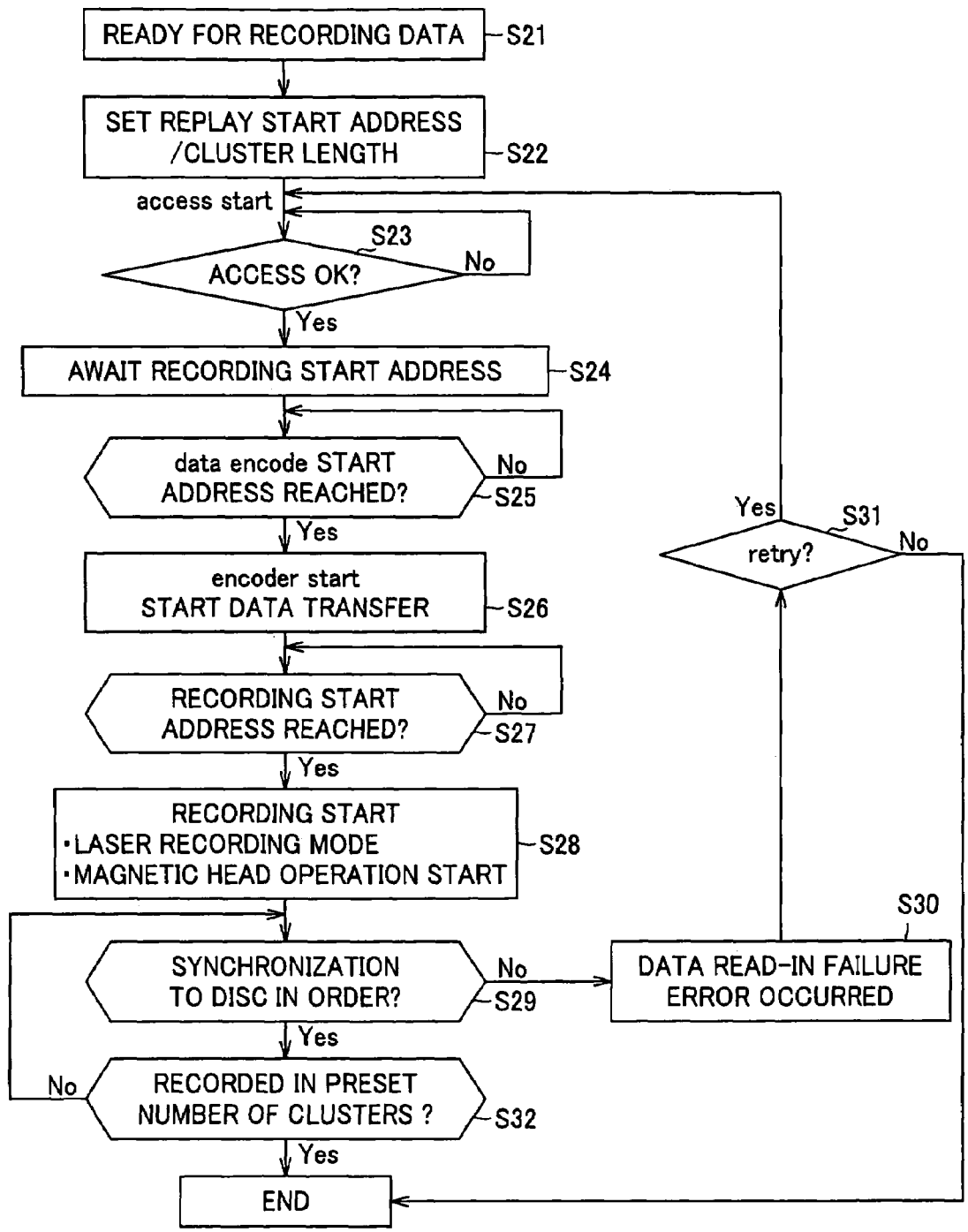
FIG. 28 is a flowchart showing the processing in a system controller in a disc drive device in case a request for reading out a given FAT sector is made from the PC.

Referring to FIG. 28, the processing by the system controller 18 in the disc driving device 10 in case a write request for a given FAT sector is made from the PC 100 is now explained.

On receipt of a write command for the FAT sector #n via USB interface 16 from the PC 100, the system controller 18 finds the next generation MD cluster number containing the FAT sector of the FAT sector number #n, specified as described above.

When the next generation MD cluster number #u, including the FAT sector number #n, is found, the system controller 18 verifies whether or not the next generation MD cluster of the cluster number #n thus found has already been read out from the disc 90 and stored in the cluster buffer memory 13. If the cluster has not been stored, the processing for reading out the next generation MD cluster of the cluster number #u is performed. That is, the system controller 18 commands the medium driving unit 11 to read out the next generation MD cluster of the cluster number #u to store the so read out next generation MD cluster in the cluster buffer memory 13.

Thus, from the FAT sector number #n, requested for writing, the system controller 18 finds the byte offset #b in the next generation MD cluster containing the sector. The system controller 18 then receives 2048 byte data, as write data for the FAT sector #n, transferred from the PC 100, via USB interface 15, and causes the data corresponding to one FAT sector data (2048 bytes) from the position of the byte offset #b in the cluster buffer memory 13.

In this manner, only the FAT sector (#n), specified by the PC 100, among the data of the next generation MD cluster (#u), stored in the cluster buffer memory 13, is in a rewritten state. The system controller 18 then prepares for writing the next generation MD cluster (#u), stored in the cluster buffer memory 13, on the disc 90. The above is the process in a step S21 for making preparations for the recording data. It is again assumed that decision as to the medium type has already been completed by another particular technique.

In the next step S22, the system controller 18 sets, from the number #u of the next generation MD cluster to be written, an ADIP address #a of the recording start position. When the ADIP address #a has been found, the system controller 18 commands the medium driving unit 11 to access to the ADIP address #a. This causes the medium driving unit 11 to access to the ADIP address #a, under control by the system controller 41.

If it is ascertained in a step S23 that the access has come to a close, the system controller 18 waits until the optical head 22 reaches the replay start address of interest. If it is ascertained in a step S25 that the data encode address has been reached, the system controller 18 in a step S26 commands the memory transfer controller 12 to start transfer to the medium driving unit 11 of data of the next generation MD cluster (#u) stored in the cluster buffer memory 13.

When it is ascertained in a step S27 that a recording start address has been reached, the system controller 18 in a step S28 commands the medium driving unit 11 to start writing data of the next generation MD cluster on the disc 90. Responsive thereto, the medium driving unit 11 starts writing data on the disc 90, under control by the system controller 41. That is, the data transferred from the memory transfer controller 12 is recorded by a recording system composed of the RS-LDC encoder 47, RLL (1-7) PP modulating unit 48, magnetic head driver 46, magnetic head 23 and the optical head 22.

The system controller 18 in a step S29 verifies whether or not synchronization with respect to the disc 90 is in good order. If synchronization with respect to the disc 90 is out of order, the system controller 18 in a step S30 generates a signal to the effect that a data readout error has occurred. If it is determined in a step S31 that readout is again executed, the process as from the step S2 is repeated.

When one cluster data has been acquired, the system controller 18 in a step S32 checks whether or not a preset cluster has been acquired. When a preset cluster has been acquired, the sequence of operations is terminated.

By the above-mentioned processing, writing the FAT sector data on the disc 90 responsive to the write request for one FAT sector from the PC 100 may be achieved. That is, the FAT sector based writing is executed as rewriting of the next generation MD cluster unit, insofar as the disc 90 is concerned.

Although the present invention has so far been elucidated with reference to certain preferred embodiments, it is apparent that these embodiments are merely illustrative and the present invention can be modified by the skilled artisan by correction or substitution of the embodiments within the scope not departing from the purport of the invention.

INDUSTRIAL APPLICABILITY

According to the present invention, the inphase-outphase matching may be achieved on an average, by equating the number of carrier waves from zone to zone, whereby low frequency components may be prohibited from being superposed on WPP signals. When the optical disc is used for a recording and/or reproducing apparatus, reproduction is by CAV in a given zone. In recording and/or reproduction, the spindle motor is controlled as conventionally, whereby the disc is in rotation as it is run by CLV.

What is claimed is:

1. A disc-shaped recording medium wherein a signal recording surface of the disc-shaped recording medium is split into a plurality of zones and wherein a track(s) is formed spirally or concentrically, such that, in each zone, the number of waves of a wobble is the same from one turn of the track to the next or from one track to the next, wherein the rate of change of the distance from the center of the disc-shaped recording medium to an outermost rim of each zone is 3% or less between neighboring zones.

2. The disc-shaped recording medium according to claim 1 wherein, in each zone, the wobble of a given turn of the track is in phase with the wobble of a neighboring turn of the track or a given track is in phase with the wobble of a neighboring track.

3. The disc-shaped recording medium according to claim 1 wherein at least two turns of a dummy track or at least two dummy tracks incapable of recording and/or reproduction are provided in the neighborhood of a boundary between two given neighboring zones.

4. The disc-shaped recording medium according to claim 1 wherein data are recorded in terms of an optional block as a unit and wherein two block units in the vicinity of the innermost rim of each zone and two block units in the vicinity of the outermost rim of each zone are formed as dummy tracks incapable of recording and/or reproduction.

5. A method for manufacturing a disc-shaped recording medium wherein the speed of rotation of the disc-shaped recording medium, having a signal recording surface split into a plurality of zones along the radial direction, is changed from one zone to the next, and wherein the wobble frequency is controlled so that, in each zone, the number of waves of the wobble of neighboring turns of the track is the same from one turn of the track to the next or the number of waves of the wobble of neighboring tracks is the same from one track to the next, wherein the wobble frequency is controlled so as to satisfy the condition that a quotient obtained on dividing the value of the clocks output by a phase synchronization circuit, that can be multiplied by M/N, with the number of waves per turn of the track or per track, is of the same value from one zone to the next, and the condition that a quotient obtained on dividing the product of the number of waves of the wobble per turn of the track or per track and the number of turns of the tracks or the number of tracks in a given zone by the number of waves of the wobble per one recording unit, representing a unit of data recording, is an integer.

6. An apparatus for manufacturing a disc-shaped recording medium comprising:
   disc rotating means for rotationally driving a disc-shaped recording medium having a signal recording surface divided into a plurality of zones along the radial direction;
   driving means for driving said disc rotating means;
   a phase synchronization circuit for generating optional clocks; and
   controlling means for controlling said driving means so that the speed of rotation of said disc-shaped recording medium is changed from one zone of the disc-shaped recording medium to the next and for controlling said phase synchronization circuit so that, in each zone, the number of waves of the wobble of optional two neighboring turns of the track or optional two tracks is equal from one zone of the disc-shaped recording medium to the next.

7. The apparatus for manufacturing a disc-shaped recording medium according to claim 6 wherein said controlling means controls said phase synchronization circuit so as to satisfy the condition that a quotient obtained on dividing the value of the clocks which are output by a phase synchronization circuit, and which can be multiplied by M/N, with the number of waves of the wobble per turn of the track or per track, is of the same value from one zone to the next, and the condition that a quotient obtained on dividing the product of the number of waves of the wobble per turn of the track or per track and the number of turns of the tracks or the number of tracks in a given zone by the number of waves of the wobble per one recording unit, representing a unit of data recording, is an integer.

8. A data recording method in which, in recording data on a disc-shaped recording medium, having a signal recording surface divided into a plurality of zones along a radial direction, said recording medium including a track(s) formed spirally or concentrically so that, in each zone, the number of waves of a wobble is equal from one turn of the track to the next or from one track to the next, recording of said data is inhibited in the vicinity of a boundary between neighboring zones, wherein, in recording the data on said disc-shaped recording medium, recording is prohibited for at least two turns of the track or at least two tracks in the vicinity of a boundary between neighboring zones.

9. The data recording method according to claim 8 wherein, in recording the data on said disc-shaped recording medium, recording is prohibited for two block units in the vicinity of the innermost rim of each zone and for two block units in the vicinity of the outermost rim of each zone.

* * * * *